(12) United States Patent
Jung et al.

(10) Patent No.: US 12,238,796 B2
(45) Date of Patent: Feb. 25, 2025

(54) APPARATUS AND METHOD FOR SUPPORTING VEHICLE-TO-EVERYTHING IN WIRELESS COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 17/626,102

(22) PCT Filed: Jul. 10, 2020

(86) PCT No.: PCT/KR2020/009142
§ 371 (c)(1),
(2) Date: Jan. 10, 2022

(87) PCT Pub. No.: WO2021/010688
PCT Pub. Date: Jan. 21, 2021

(65) Prior Publication Data
US 2022/0264678 A1    Aug. 18, 2022

(30) Foreign Application Priority Data

Jul. 12, 2019  (KR) .................. 10-2019-0084584
Nov. 15, 2019  (KR) .................. 10-2019-0146698
Jul. 9, 2020  (KR) .................. 10-2020-0084736

(51) Int. Cl.
*H04W 76/15* (2018.01)
*H04W 4/40* (2018.01)
*H04W 48/10* (2009.01)

(52) U.S. Cl.
CPC ............. *H04W 76/15* (2018.02); *H04W 4/40* (2018.02); *H04W 48/10* (2013.01)

(58) Field of Classification Search
CPC ....... H04W 76/15; H04W 4/40; H04W 48/10; H04W 48/12; H04W 76/40; H04W 88/06;
(Continued)

(56) References Cited

U.S. PATENT DOCUMENTS 10,575,360 B2    2/2020  Jang et al.
2020/0314960 A1*  10/2020  Basu Mallick ....... H04W 76/27
(Continued)

FOREIGN PATENT DOCUMENTS

| CN | 107667559 A | 2/2018 |
|---|---|---|
| KR | 10-2020-0094343 A | 8/2020 |
| WO | 2019022470 A1 | 1/2019 |

OTHER PUBLICATIONS

International Search Report and Written Opinion of the International Searching Authority dated Nov. 5, 2020, in connection with International Application No. PCT/KR2020/009142, 7 pages.
(Continued)

*Primary Examiner* — John D Blanton

(57) ABSTRACT

The present disclosure relates to a 5th generation (5G) or pre-5G communication system for supporting higher data transmission rates than a 4th generation (4G) communication system, such as long term evolution (LTE). The present disclosure provides an apparatus and a method for supporting vehicle-to-everything (V2X) in a wireless communication system. A method for operating a first terminal in a wireless communication system provided by the present disclosure comprises the processes of: receiving first system information for vehicle-to-everything (V2X) sidelink communication from a first base station in a remote resource control (RRC) idle mode or RRC inactive mode; establishing, if the first system information includes sidelink con-
(Continued)

figuration information, a first sidelink radio bearer (SLRB) on the basis of the sidelink configuration information; performing V2X sidelink communication with a second terminal via the first SLRB; transitioning to an RRC connected mode; and performing V2X sidelink communication with the second terminal via the first SLRB until an RRC reconfiguration message is received from the first base station.

8 Claims, 19 Drawing Sheets

(58) Field of Classification Search
CPC ..... H04W 76/14; H04W 92/18; H04W 76/12; H04W 76/27; H04W 48/08
See application file for complete search history.

(56) References Cited

U.S. PATENT DOCUMENTS

| | | | |
|---|---|---|---|
| 2021/0410129 A1* | 12/2021 | Freda | H04W 72/543 |
| 2022/0217575 A1* | 7/2022 | Wang | H04W 28/0268 |
| 2023/0284084 A1* | 9/2023 | Chae | H04L 5/0051 |
| | | | 370/230 |

OTHER PUBLICATIONS

Huawei, et al., "Radio bearer configuration and management for NR sidelink," R2-1816522, 3GPP TSG-RAN WG2 Meeting #104, Spokane, USA, Nov. 12-16, 2018, 5 pages.
LG Electronics, "NR PC5 QoS modelling and operations in EPC," S2-1907580 (revision of S2-19xxxxx), SA WG2 Meeting #134, Jun. 24-28, 2019, Sapporo, Japan, 5 pages.
Oppo, "Discussion on PC5-RRC for unicast," R2-1903211, 3GPP TSG-RAN WG2 Meeting #105bis, Xi'an, China, Apr. 8-12, 2019, 9 pages.
Qualcomm Incorporated, "QoS for NR V2X," R2-1905196 (was R2-1903043), 3GPP TSG-RAN WG2 Meeting #105bis, Xi'an, China, Apr. 8-12, 2019, 5 pages.
ZTE Corporation, et al., "Discussion on QoS management for NR V2X," R2-1903625, 3GPP TSG-RAN WG2 #105bis, Xi'an, China, Apr. 8-12, 2019, 4 pages.
Huawei et al., "Radio bearer configuration and management for NR sidelink", 3GPP TSG-RAN WG2 Meeting #104, Nov. 12-16, 2018, R2-1816522, 5 pages.
LG Electronics, "TS 23.287 NR PC5 QoS handling—information provided to AS layer", SA WG2 Meeting #134, Jun. 24-28, 2019, S2-1908214, 7 pages.
LG Electronics et al., "NR PC5 QoS modelling and operations in EPC", Change Request, 3GPP TSG-SA WG2 Meeting #134, Jun. 24-28, 2019, S2-1907581, 6 pages.
ZTE Corporation et al., "Discussion on QoS support for NR V2X", 3GPP TSG RAN WG2 Meeting #106, May 13-17, 2019, R2-1906496, 5 pages.
Samsung, "Unicast SLRB configuration for RRC_IDLE UEs or RRC_INACTIVE UEs", 3GPP TSG-RAN WG2 Meeting #105, Feb. 25-Mar. 1, 2019, 3 pages.
Supplementary European Search Report dated Aug. 5, 2022 in connection with European Patent Application No. 20 84 1435, 13 pages.
Communication pursuant to Article 94(3) EPC dated Sep. 13, 2024, in connection with European Application No. 20841435.9, 6 pages.
Notification of the First Office Action dated Dec. 31, 2024, in connection with Chinese Application No. 202080050812.0, 11 pages.

* cited by examiner

APPARATUS AND METHOD FOR SUPPORTING VEHICLE-TO-EVERYTHING IN WIRELESS COMMUNICATION SYSTEM

CROSS-REFERENCE TO RELATED APPLICATIONS

This application is a 371 National Stage of International Application No. PCT/KR2020/009142, filed Jul. 10, 2020, which claims priority to Korean Patent Application No. 10-2019-0084584, filed Jul. 12, 2019, Korean Patent Application No. 10-2019-0146698, filed Nov. 15, 2019, and Korean Patent Application No. 10-2020-0084736, filed Jul. 9, 2020, the disclosures of which are herein incorporated by reference in their entirety.

BACKGROUND

1. Field

The disclosure relates generally to a wireless communication system and, more particularly, to an apparatus and a method for supporting vehicle-to-everything (V2X) communication in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post Long Term Evolution (Post LTE)" system.

The 5G communication system is considered to be implemented in higher frequency (mmWave) bands (e.g., 60 GHz bands) so as to accomplish higher data rates. To decrease propagation loss of the radio waves and increase the transmission distance in the mmWave bands, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In a 5G system, a vehicle-to-everything (V2X) technology is being considered. In order to support a V2X operation in a new radio (NR) system separately from a V2X operation in the conventional LTE system, a detailed procedure for meeting new requirements of the NR system is being discussed.

SUMMARY

Based on the above discussion, the disclosure provides an apparatus and a method for effectively supporting vehicle-to-everything (V2X) in a wireless communication system.

In accordance with an aspect of the disclosure, a method of operating a first UE in a wireless communication system includes receiving first system information for vehicle-to-everything (V2X) sidelink communication from a first BS in a remote resource control (RRC)-idle mode or an RRC-inactive mode, in case that sidelink configuration information is included in the first system information, establishing a first sidelink bearer (sidelink radio bearer (SLRB)), based on the sidelink configuration information, performing V2X sidelink communication with a second UE through the first SLRB, transitioning to an RRC-connected mode, and performing V2X sidelink communication with the second UE through the first SLRB before receiving an RRC reconfiguration message from the first BS.

In accordance with another aspect of the disclosure, a first UE in a wireless communication system includes a transceiver, and at least one processor, wherein the at least one processor is configured to receive first system information for vehicle-to-everything (V2X) sidelink communication from a first BS in a remote resource control (RRC)-idle mode or an RRC-inactive mode, establish a first sidelink bearer (sidelink radio bearer (SLRB)), based on sidelink configuration information in case that the sidelink configuration information is included in the first system information, perform V2X sidelink communication with a second UE through the first SLRB, transition to an RRC-connected mode, and perform V2X sidelink communication with the second UE through the first SLRB before receiving an RRC reconfiguration message from the first BS.

An apparatus and a method according to various embodiments of the disclosure can effectively support vehicle-to-everything (V2X) in a wireless communication system.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure describes a technology for effectively supporting vehicle-to-everything (V2X) in a wireless communication system.

As used in the description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, various embodiments of the disclosure will be described using terms used in some communication standards (e.g., 3rd generation partnership project (3GPP)), but they are for illustrative purposes only. Various embodiments of the disclosure may also be easily modified and applied to other communication systems.

Figure 1:
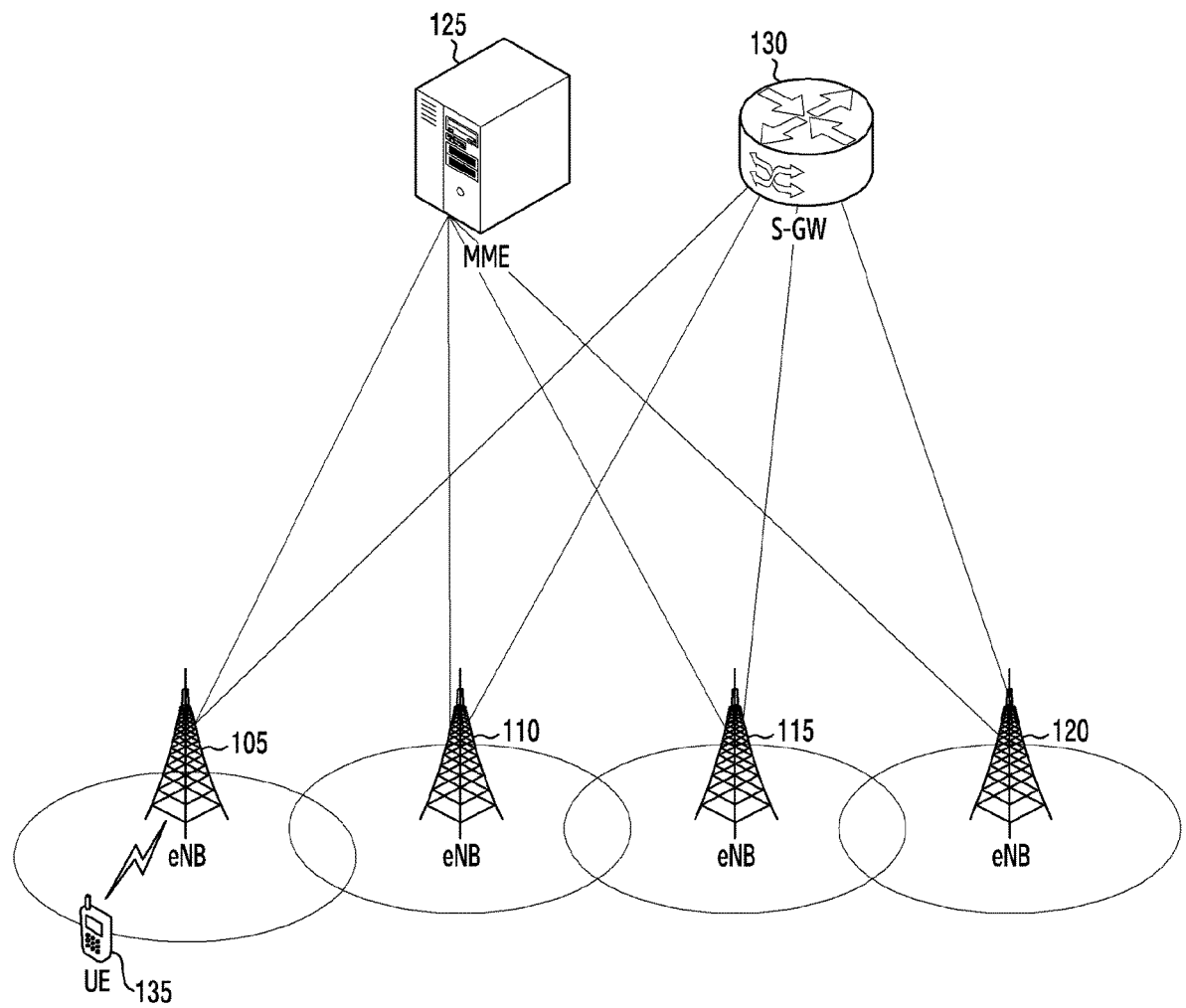
FIG. 1 illustrates an example of a wireless communication system according to various embodiments of the disclosure.

FIG. 1 illustrates an example of a wireless communication system according to various embodiments of the disclosure.

Specifically, FIG. 1A illustrates a structure of a long term evolution (LTE) system according to an embodiment of the disclosure.

Referring to FIG. 1, a radio access network of the LTE system includes next-generation base stations (evolved node Bs, ENBs, Node Bs, or base stations) 105, 110, 115, and 120, a mobility management entity (MME) 125, and a serving gateway (S-GW) 130. A user equipment 135 (UE or terminal) accesses an external network through the ENBs 105, 110, 115, and 120 and the S-GW 130.

In FIG. 1, the ENBs 105, 110, 115, and 120 may correspond to conventional node Bs of a universal mobile telecommunication system (UMTS). The ENB may be connected to the UE 135 through a radio channel, and may play a more complicated role than the conventional node B. In the LTE system, all user traffic including a real-time service such as a voice over internet protocol or voice over IP (VoIP) through an Internet protocol may be served through a shared channel. Accordingly, a device for collecting and scheduling status information such as buffer statuses, available transmission power statuses, and channel statuses of UEs is needed, which is served by the ENBs 105, 110, 115, and 120.

One ENB may generally control a plurality of cells. For example, in order to implement a transmission rate of 100 Mbps, the LTE system uses, for example, orthogonal frequency division multiplexing (OFDM) as the radio access technology in a bandwidth of 20 MHz. Further, an adaptive modulation and coding (AMC) scheme of determining a modulation scheme and a channel coding rate in accordance with the channel status of the UE may be applied. The S-GW 130 is a device for providing a data bearer and may generate or remove a data bearer according to the control of the MME 125. The MME is a device for performing a function of managing mobility of the UE and various control functions, and may be connected to a plurality of ENBs.

Figure 2:
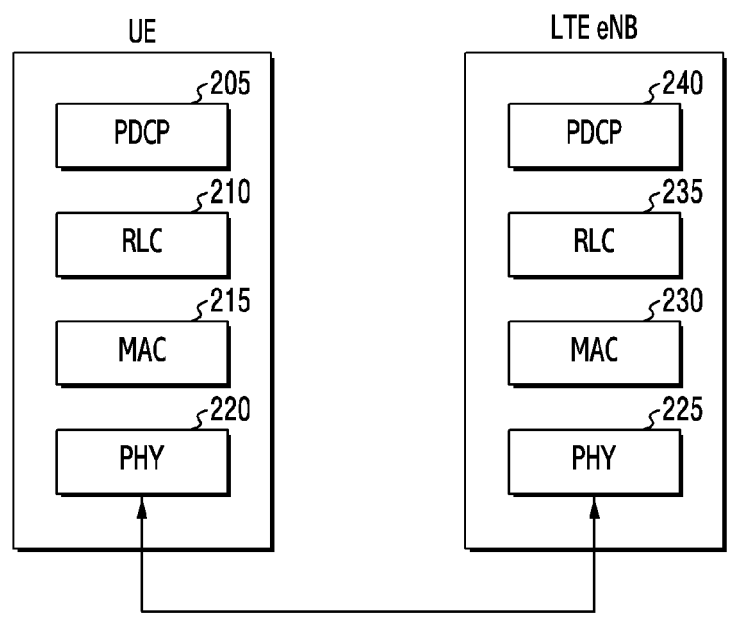
FIG. 2 illustrates an example of a wireless protocol structure in a wireless communication system according to various embodiments of the disclosure.

FIG. 2 illustrates an example of a wireless protocol structure in a wireless communication system according to various embodiments of the disclosure.

Specifically, FIG. 2 illustrates a wireless protocol structure in an LTE system according to an embodiment of the disclosure.

Referring to FIG. 2, the wireless protocol of the LTE system may include packet data convergence protocols (PDCPs) 205 and 240, radio link controls (RLCs) 210 and 235, medium access controls (MACs) 215 and 230, respectively, in UE and the ENB.

The PDCPs 205 and 240 may perform an operation of compressing/reconstructing an internet protocol (IP) IP header. Main functions of the PDCPs 205 and 204 may be described below.

Header compression and decompression function (header compression and decompression: robust header compression (ROHC) only)
User data transmission function (transfer of user data)
Sequential delivery function (In-sequence delivery of upper layer PDUs at PDCP re-establishment procedure for RLC AM)
Reordering function (For split bearers in dual connectivity (DC) (only support for RLC AM): PDCP PDU routing for transmission and PDCP PDU reordering for reception)
Duplicate detection function (duplicate detection of lower layer Service Data Units (SDUs) at PDCP re-establishment procedure for RLC AM)
Retransmission function (retransmission of PDCP SDUs at handover and, for split bearers in DC, of PDCP PDUs at PDCP data-recovery procedure, for RLC AM)
Ciphering and deciphering function (ciphering and deciphering)
Timer-based SDU deletion function (timer-based SDU discard in uplink)

The radio link controls (RLCs) 210 and 235 may perform an automatic repeat request (ARQ) operation by reconfiguring a PDCP packet data unit (PDU) to have the proper size. Main functions of the RLCs 210 and 235 may be described below.

Data transmission function (transfer of upper layer PDUs)
ARQ function (error correction through ARQ (only for AM data transfer))
Concatenation, segmentation, and reassembly function (concatenation, segmentation, and reassembly of RLC SDUs (only for UM and AM data transfer))
Re-segmentation function (re-segmentation of RLC data PDUs (only for AM data transfer))
Reordering function (reordering of RLC data PDUs (only for unacknowledged mode (UM) and acknowledged mode (AM) data transfer)
Duplication detection function (duplicate detection (only for UM and AM data transfer))
Error detection function (protocol error detection (only for AM data transfer))
RLC SDU deletion function (RLC SDU discard (only for UM and AM data transfer))
RLC re-establishment function (RLC re-establishment)

The MACs 215 and 230 are connected with various RLC layer devices included in one UE, and perform an operation for multiplexing RLC PDUs to the MAC PDU and demultiplexing the RLC PDUs from the MAC PDU. Main functions of the MACs 215 and 230 may be described below.

Mapping function (mapping between logical channels and transport channels)
Multiplexing and demultiplexing function (multiplexing/demultiplexing of MAC SDUs belonging to one or different logical channels into/from Transport Blocks (TB) delivered to/from the physical layer on transport channels)
Scheduling information report function (scheduling information reporting)
HARQ function (error correction through HARQ)
Logical channel priority control function (priority handling between logical channels of one UE)
UE priority control function (priority handling between UEs by means of dynamic scheduling)
Multimedia Broadcast Multicast Service (MBMS) service identification function (MBMS service identification)
Transport format selection function (transport format selection)
Padding function (padding)

The physical layers (PHYs) 220 and 225 perform an operation for channel-coding and modulating higher-layer data to generate OFDM symbols and transmitting the OFDM symbols through a radio channel or demodulating and channel-decoding the OFDM symbols received through the radio channel and transmitting the demodulated and channel-decoded OFDM symbols to the higher layer.

Figure 3:
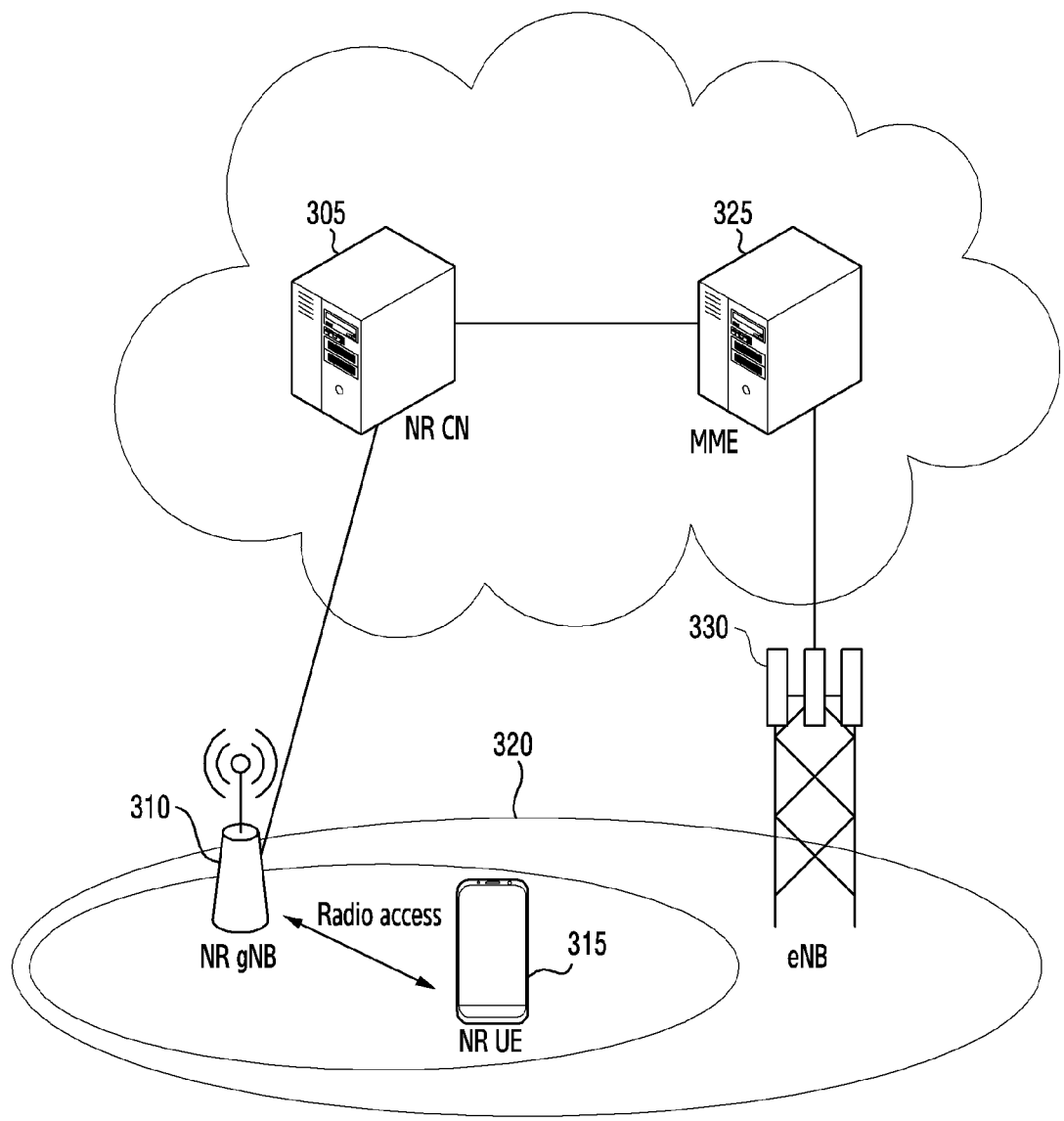
FIG. 3 illustrates an example of the structure of a wireless communication system according to various embodiments of the disclosure.

FIG. 3 illustrates an example of the structure of a wireless communication system according to various embodiments of the disclosure.

Specifically, FIG. 3 illustrates the structure of a next-generation mobile communication system according to an embodiment of the disclosure.

Referring to FIG. 3, a radio access network of a next-generation mobile communication system (new radio, NR, 5th generation, or 5g) may include a next-generation base station (new radio Node B, NR gNB, or NR base station) 310 and a next-generation radio core network (new radio core network or NR CN) 305. A next-generation radio user terminal 315 (new radio user equipment, NR UE, or NR terminal) may access an external network through the NR gNB 310 or the NR CN 305.

In FIG. 3, the NR gNB 310 may correspond to an evolved Node B (eNB) in the conventional LTE system. The NR gNB may be connected to the NR UE 315 through a radio channel and may provide better service than the conventional node B. In the next-generation mobile communication system, all user traffic may be served through a shared channel. Accordingly, a device for collecting and scheduling status information such as buffer statuses, available transmission power statuses, and channel statuses of UEs is needed, which is served by the NR gNB 310. One NR gNB 310 may control a plurality of cells. In the next-generation mobile communication system, a bandwidth higher than or equal to the current maximum bandwidth may be applied to implement super high speed data transmission compared to current LTE. Further, a beamforming technology may be additionally used on the basis of orthogonal frequency division multiplexing (OFDM) as a radio access technology. In addition, an adaptive modulation and coding (AMC) scheme of determining a modulation scheme and a channel coding rate in correspondence to a channel status of the NR UE may be applied.

The NR CN 305 may perform a function of supporting mobility, configuring a bearer, and configured QoS. The NR CN 305 is a device which performs various control function as well as a function of managing mobility of the UE and may be connected to a plurality of NR gNBs. Further, the next-generation mobile communication system may be linked to the conventional LTE system, and the NR CN 305 may be connected to an MME 325 through a network interface. The MME 325 may be connected to an eNB 330 which is the conventional base station.

Figure 4:
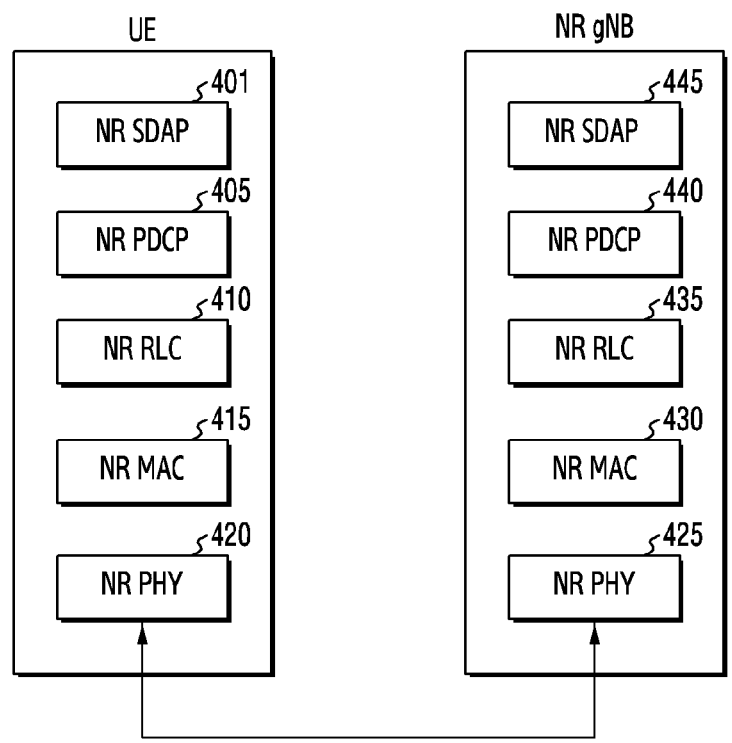
FIG. 4 illustrates an example of a wireless protocol structure in a wireless communication system according to various embodiments of the disclosure.

FIG. 4 illustrates an example of a wireless protocol structure in a wireless communication system according to various embodiments of the disclosure.

Specifically, FIG. 4 illustrates a wireless protocol structure of a next-generation mobile communication system according to an embodiment of the disclosure.

Referring to FIG. 4, the wireless protocol of the next-generation mobile communication system includes NR service data adaptation protocols (SDAPs) 401 and 445, NR PDCPs 405 and 440, NR RLCs 410 and 435, NR MACs 415 and 430, and NR PHYs 420 and 425 in the UE and the NR gNB.

Main functions of the NR SDAPs 401 and 445 may include some of the following functions.
   User data transmission function (transfer of user-plane data)
   Function of mapping QoS flow and a data bearer for uplink and downlink (mapping between a QoS flow and a DRB for both DL and UL)
   Function of marking a QoS flow ID for uplink and downlink (marking QoS flow identifier (ID) in both downlink (DL) and uplink (UL) packets)
   Function of mapping reflective QoS flow to a data bearer for uplink SDAP PDUs (reflective QoS flow to DRB mapping for the UL SDAP PDUs)

For the SDAP layer device, the UE may receive a configuration indicating whether to use the header of the SDAP layer device or the function of the SDAP layer device for each PDCP layer device, each bearer, or each logical channel through a radio resource control (RRC) message. In case that the SDAP header is configured, the UE may indicate an update or a reconfiguration of mapping information for uplink and downlink QoS flow and the data bearer through a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. The SDAP header may include QoS flow ID information indicating the QoS. The QoS information may be used as data-processing-priority or scheduling information to support a seamless service.

Main functions of the NR PDCPs 405 and 440 may include some of the following functions.
   Header compression and decompression function (header compression and decompression: robust header compression (ROHC) only)
   User data transmission function (transfer of user data)
   Sequential delivery function (in-sequence delivery of upper layer PDUs)
   Non-sequential delivery function (out-of-sequence delivery of upper layer PDUs)
   Reordering function (PDCP PDU reordering for reception)
   Duplicate detection function (duplicate detection of lower layer SDUs)
   Retransmission function (retransmission of PDCP SDUs)
   Ciphering and deciphering function (ciphering and deciphering)
   Timer-based SDU deletion function (timer-based SDU discard in uplink)

In the above examples, the reordering function of the NR PDCP device is a function of sequentially reordering PDCP PDUs received by a lower layer on the basis of a PDCP sequence number (SN). The reordering function of the NR PDCP device may include a function of sequentially transmitting reordered data to a higher layer, a function of directly transmitting the recorded data without consideration of the order, a function of recording PDCP PDUs lost due to the reordering, a function of reporting statuses of the lost PDCP PDUs to a transmitting side, and a function of making a request for retransmitting the lost PDCP PDUs Main functions of the NR RLCs 410 and 435 may include some of the following functions.
   Data transmission function (transfer of upper layer PDUs)
   Sequential delivery function (in-sequence delivery of upper layer PDUs)
   Non-sequential delivery function (out-of-sequence delivery of upper layer PDUs)
   ARQ function (error correction through ARQ)
   Concatenation, segmentation, and reassembly function (concatenation, segmentation, and reassembly of RLC SDUs)
   Re-segmentation function (re-segmentation of RLC data PDUs)
   Reordering function (reordering of RLC data PDUs)
   Duplicate detection function (duplicate detection)
   Error detection function (protocol error detection)
   RLC SDU deletion function (RLC SDU discard)
   RLC re-establishment function (RLC re-establishment)

In the above description, the sequential delivery function (in-sequence delivery) of devices of the NR RLCs 410 and 435 may be a function of sequentially transferring RLC SDUs received from a lower layer to a higher layer. In case that one RLC SDU is divided into a plurality of RLC SDUs and received, the sequential delivery function (in-sequence delivery) of the devices of the NR RLCs 410 and 435 may include a function of reassembling and then transmitting the RLC SDUs.

The sequential delivery function (in-sequence delivery) of the devices of the NR RLCs 410 and 435 may include a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, and a function of making a request for retransmitting the lost RLC PDUs.

The sequential delivery function (in-sequence delivery) of the devices of the NR RLCs 410 and 435 may include a function of, if there is a lost RLC SDU, sequentially transferring only RLC SDUs preceding the lost RLC SDU to the higher layer. Further, the sequential delivery function (in-sequence delivery) of the NR RLC devices may include a function of, if a predetermined timer expires even though there are lost RLC SDUs, sequentially transferring all RLC SDUs received before the predetermined timer expires to the higher layer. In addition, the sequential delivery function (in-sequence delivery) of the devices of the NR RLCs 410 and 435 may include a function of, if a predetermined timer expires even though there are lost RLC SDUs, sequentially transferring all RLC SDUs received up to now to the higher layer.

The devices of the NR RLCs 410 and 435 may sequentially process the received RLC PDUs regardless of the order of sequence numbers (out-of-sequence delivery) and transfer the RLC PDUs to the devices of the NR PDCPs 405 and 440.

When receiving segments, the devices of the NR RLCs 410 and 435 may receive segments stored in the buffer or to be received in the future, reconfigure the segments to be one complete RLC PDU, and then transfer the RLC PDU to the NR PDCP devices.

Layers of the NR RLCs 410 and 435 may not include a concatenation function, and the function may be performed by the NR MAC layer, or may be replaced with a multiplexing function of the layers of the NR RLCs 410 and 435.

In the above description, the non-sequential delivery function (out-of-sequence delivery) of the devices of the NR RLCs 410 and 435 may be a function of sequentially transferring RLC SDUs received from a lower layer to a higher layer regardless of the order thereof. In case that one RLC SDU is divided into a plurality of RLC SDUs and received, the non-sequential delivery function (out-of-sequence delivery) of the devices of the NR RLCs 410 and 435 may include a function of reassembling and then transmitting the RLC SDUs. The non-sequential delivery function (out-of-sequence delivery) of the devices of the NR RLCs 410 and 435 may include a function of storing RLC SNs or PDCP SNs of the received RLC PDUs, reordering the same, and recording lost RLC PDUs.

The NR MACs 415 and 430 may be connected to a plurality of layer devices of the NR RLCs 410 and 435 configured in one UE and main functions of the NR MACs 415 and 430 may include some of the following functions.

Mapping function (Mapping between logical channels and transport channels)
Multiplexing and demultiplexing function (Multiplexing/demultiplexing of MAC SDUs)
Scheduling information report function (Scheduling information reporting)
HARQ function (Error correction through HARQ)
Logical channel priority control function (Priority handling between logical channels of one UE)
UE priority control function (Priority handling between UEs by means of dynamic scheduling)
MBMS service identification function (MBMS service identification)
Transport format selection function (Transport format selection)
Padding function (Padding)

The NR PHY layers 420 and 425 may perform an operation for channel-coding and modulating higher-layer data to generate OFDM symbols and transmitting the OFDM symbols through a radio channel or demodulating and channel-decoding the OFDM symbols received through the radio channel and transmitting the demodulated and channel-decoded OFDM symbols to the higher layer.

Figure 5:
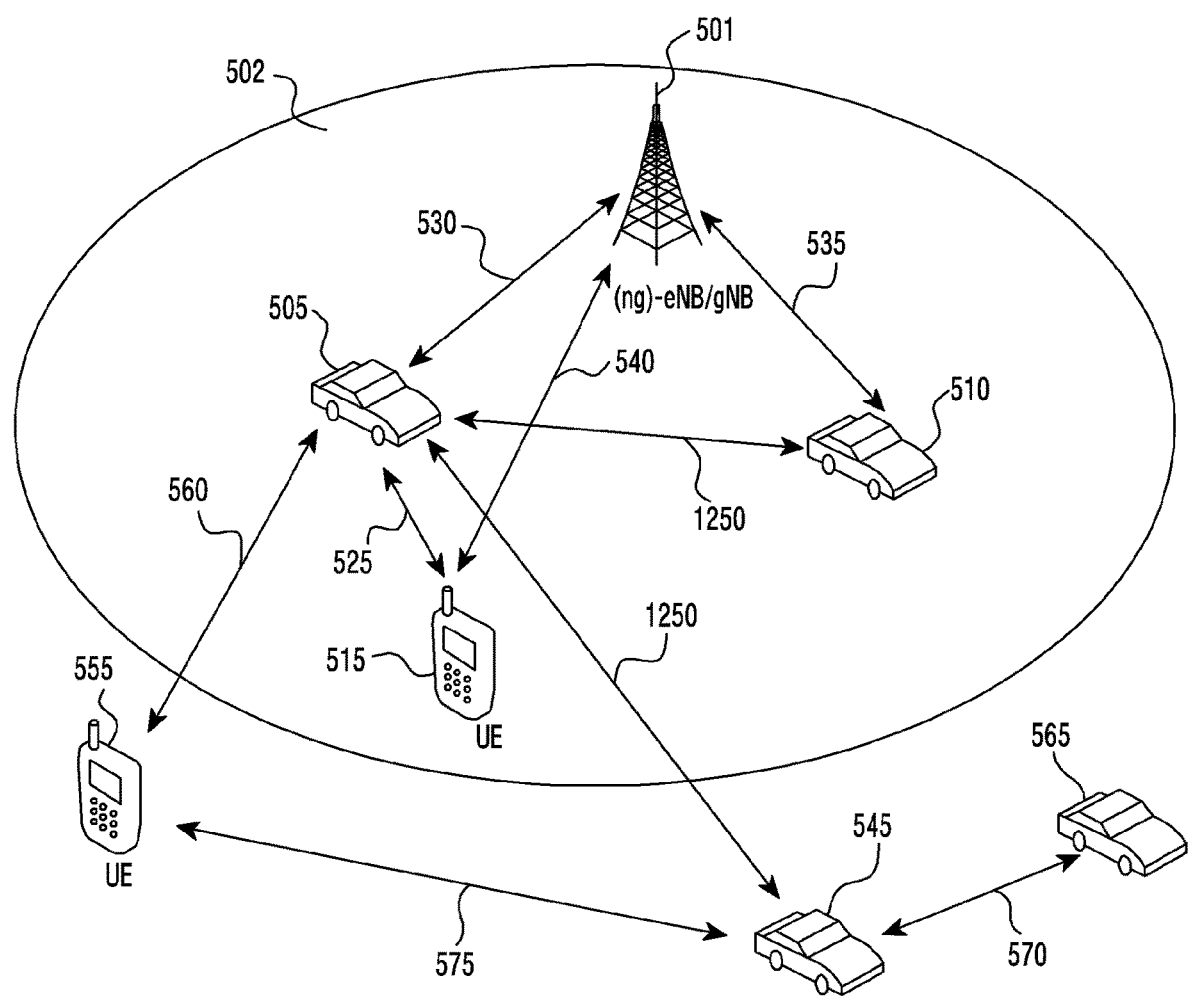
FIG. 5 illustrates an example of vehicle-to-everything (V2X) communication in a wireless communication system according to various embodiments of the disclosure.

FIG. 5 illustrates an example of vehicle-to-everything (V2X) communication in a wireless communication system according to various embodiments of the disclosure.

Specifically, FIG. 5 illustrates V2X communication in a next-generation mobile communication system according to an embodiment of the disclosure.

Vehicle-to-everything (V2X) according to an embodiment of the disclosure inclusively indicates communication technologies through a vehicle and all interfaces, and there are vehicle-to-vehicle (V2X), vehicle-to-infrastructure (V2I), vehicle-to-pedestrian (V2P), and vehicle-to-network (V2N) according to a form thereof and components therein.

Referring to FIG. 5, a (ng)-eNB/gNB 501 may include at least one vehicle UE 505 and 510 located within a cell 502 supporting V2X and a pedestrian portable UE 515. At this time, V2X can be supported through a Uu interface (UTMS air interface) and/or PC5 (LTE-V2X or 5G-V2X) interface. In case that V2X is supported through the Uu interface, the vehicle UEs 505 and 510 may perform V2X cellular communication through uplink/downlink (UL/DL) 530 and 535 between the vehicle UE and (ng)-eNB/gNB with the (ng)-eNB/gNB 501, or the pedestrian UE 515 may perform V2X cellular communication through the uplink/downlink (DL/DL) 540 between the pedestrian UE and the (ng)-eNB/gNB according to an embodiment. In case that V2X is supported through the PC5 interface, V2X sidelink (SL) communication may be performed through links (sidelinks (SLs)) 520 and 525 between UEs. According to an embodiment, the vehicle UE 505 existing in the coverage of the (ng)-eNB/gNB (in coverage of E-UTRA/NR) may transmit and receive a V2X packet to and from other vehicle UEs 510 and 545 and/or pedestrian portable UEs 515 and 555 through sidelinks (SLs) 520, 550, 525, and 560 which are transmission channels. The V2X packet may be transmitted and received in a broadcast transmission type and/or a unicast and/or groupcast transmission type.

The UE supporting V2X sidelink communication may transmit and receive a V2X packet through a resource allocation mode (scheduled resource allocation or UE autonomous resource selection). Scheduled resource allocation (mode 1 and/or mode 3) is a mode in which the (ng)-eNB/gNB allocates resources used for sidelink transmission to an RRC-connected mode UE in a dedicated scheduling scheme. The (ng)-eNB/gNB can manage sidelink resources in the mode, the mode may be efficient to manage interference and/or manage a resource pool (dynamic allocation or semi-persistence transmission). In case that the RRC-connected mode UE has data to be transmitted to another UE(s), the UE may transmit information indicating that the UE has data to be transmitted to another UE(s) to the (ng)-eNB/gNB through an RRC message or a MAC control element (CE). According to an embodiment, a SidelinkUE-Information message or a UEAssistanceInformation message may be used as the RRC message, and a buffer status report MAC CE in a new format (including at least an indicator indicating a buffer status report through V2X communication and information on the size of data buffered for sidelink communication) may be used as the MAC CE.

The UE autonomous resource selection (mode 2 and/or mode 4) is a mode in which the (ng)-eNB/gNB provides sidelink resource information/pool to the UE supporting V2X sidelink communication through system information and/or the RRC message and the UE selects resources according to a predetermined rule. According to an embodiment, the (ng)-eNB/gNB may signal SIB21 (SystemInformationBlockType21), SIB26, or SIM to be newly defined for an NR V2X UE and provide sidelink resource information to the UE. According to an embodiment, as the RRC message, the (ng)-eNB/gNB may signal an RRC connection reconfiguration message (RRC connection reset RRCConnectionReconfiguration) message) and/or a connection resumption message (RRCResume message) to the UE and provide sidelink resource information. Further, the UE autonomous resource selection may assist the UE in selecting resources used for the sidelink through a PC5-RRC message and/or a MAC CE or allocate resources used for sidelink transmission to other UE(s) through direct/indirect scheduling. That is, the UE autonomous resource selection mode may indicate one or a plurality of pieces of information below.

The UE autonomously selects sidelink resources for transmission

The UE assists sidelink resource selection for other UEs.

The UE is configured by an NR-configured grant for sidelink transmission.

The UE schedules sidelink transmission of other UEs.

A method of selecting resources by the UE may include zone mapping, sensing-based resource selection, random selection, and configured grant-based resource selection.

The UE supporting V2X sidelink communication may transmit and receive a V2X packet on the basis of a preconfigured resource pool (preconfiguration resources) included in an SL-V2X-preconfiguration which is an information element (IE). According to an embodiment, in case that the UE cannot perform V2X sidelink communication based on scheduled resource allocation and/or UE autonomous resource selection mode for a predetermined reason even though the UE exists within the coverage of the (ng)-eNB/gNB, the UE can perform V2X sidelink communication through the sidelink transmission/reception resource pool preconfigured in the SL-V2X-Preconfiguration which is the IE. Further, the vehicle UE 545 (out-of-coverage of E-UTRA/NR) may perform V2X sidelink communication on the basis of the sidelink preconfigured resources (preconfiguration resources) through the sidelinks (SLs) 570 and 575 which are transmission channels with another vehicle UE 565 or the portable UE 555.

The LTE V2X SL communication system is designed to aim at a basic safety service. That is, the UE supporting the LTE V2X SL communication is designed to provide the basic safety service to all neighboring UEs supporting LTE V2X SL communication through a broadcast transmission scheme. Accordingly, the UE is not required to perform a process of establishing a separate session or an SL connection process with another specific UE (sidelink connection establishment procedure).

However, in the next-generation mobile communication (NR), the V2X SL communication system may be designed to provide not only the basic safety service but also various improved services (for example, autonomous driving service, platooning service, remote driving service, and infotainment within a vehicle). Accordingly, the NR V2X SL communication system may be designed to support a unicast and/or groupcast transmission type as well as the broadcast transmission type.

Hereinafter, FIGS. 6 to 13 illustrate various embodiments for acquiring system information to support vehicle communication in a next-generation mobile communication system.

Figure 6:
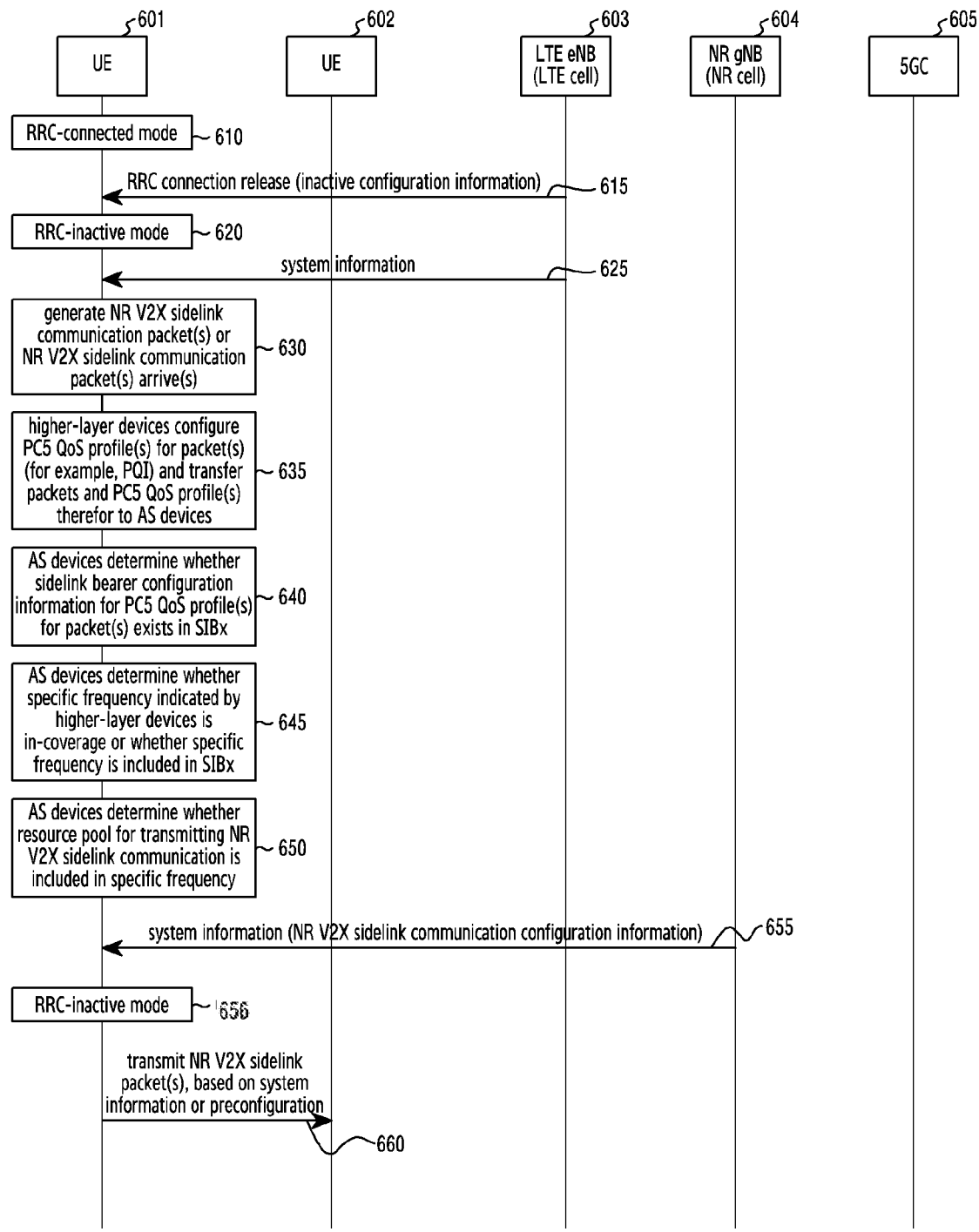
FIG. 6 illustrates an example of a procedure in which a UE switches from a radio resource control (RRC)-connected mode (RRC_CONNECTED) to an RRC inactive mode (RRC_INACTIVE) with a long term evolution (LTE) BS (new generation evolved node B (ng-eNB) connected to a 5G core network (5GC) and a procedure in which a UE in the RRC inactive mode performs new radio (NR) V2X sidelink communication in a wireless communication system according to various embodiments of the disclosure.

FIG. 6 illustrates an example of a procedure in which a UE switches from a radio resource control (RRC)-connected mode (RRC_CONNECTED) to an RRC inactive mode (RRC_INACTIVE) with a long term evolution (LTE) eNB (new generation evolved node B (ng-eNB)) connected to a 5G core network (5GC) and a procedure in which a UE in the RRC inactive mode performs new radio (NR) V2X sidelink communication in a wireless communication system according to various embodiments of the disclosure.

The UEs 601 and 602 according to an embodiment of the disclosure may refer to a vehicle UE or a pedestrian UE. The UEs 601 and 602 may support V2X sidelink communication through one or a plurality of radio access technologies (RATs). According to an embodiment, the UEs 601 and 602 may support only LTE V2X sidelink communication or only NR V2X sidelink communication, or may support both the LTE V2X sidelink communication and the NR V2X sidelink communication. The LTE eNB 603 according to an embodiment of the disclosure may periodically broadcast system information related to LTE V2X sidelink configuration information and/or system information related to NR V2X sidelink configuration information.

In case that the UE 601 according to an embodiment of the disclosure is configured to simultaneously transmit the NR V2X sidelink communication and the LTE V2X sidelink communication, if the UE does not simultaneously acquire NR V2X sidelink communication configuration information and LTE V2X sidelink communication configuration information from one cell, the UE may camp on one of a cell providing only the NR V2X sidelink communication configuration information or a cell providing only the LTE V2X sidelink communication configuration information. In case that at least one second cell 604 that satisfies a cell selection condition (S criterion) for a frequency in which V2X sidelink communication is configured is detected in the state in which the UE 601 camps on the first cell 603 providing only one of the NR V2X sidelink communication configuration information or the LTE V2X sidelink communication configuration information, it may be determined whether the UE 601 is in coverage for at least one second cell 604 providing the LTE V2X sidelink communication configuration information or the NR V2X sidelink communication configuration information which the first cell 603 cannot provide. In case that it is determined that the UE 601 is in coverage for the second cell 604, the UE 601 may acquire only system information including the V2X sidelink communication configuration information from the second cell 604 without cell selection/reselection of the detected second cell 604. The V2X sidelink communication configuration information included in the system information acquired from the second cell 604 is LTE V2X sidelink communication configuration information or NR V2X sidelink communication configuration information which the first cell 603 providing only one of the NR V2X sidelink communication configuration information or LTE V2X sidelink communication configuration information cannot provide. In case that the UE 601 is not in coverage for the second cell 604, that is, in case that the UE 601 is out of coverage (OOC) for the second cell 604, the UE 601 may use a preconfiguration.

Referring to FIG. 6, the UE 601 may transmit and receive data to and from the LTE eNB 603 connected to a 5GC in an RRC-connected mode (RRC_CONNECTED) in operation 610.

In case that there is no transmission/reception of data for a predetermined reason or for a predetermined time, the LTE eNB 603 cannot transmit an RRC connection release message (RRCConnectionRelease message) including inactive configuration information (RRC-InactiveConfig) in operation 615.

The UE 601 receiving the RRC connection release message may switch to an RRC inactive mode (RRC_INACTIVE) in operation 620.

The UE 601 in the RRC inactive mode may discover a suitable LTE cell 603 through a cell selection procedure or a cell reselection procedure and camp on the discovered cell to acquire system information in operation 625. According to an embodiment, the system information may be one or a plurality of SIBx including MIB1 (MaterInformationBlock-Type1), SIB1, SIB2, SIB3, SIB4, SIB5, SIB21, SIB26, and/or NR V2X sidelink configuration information defined/introduced for NR V2X sidelink communication. The cell which the UE camps on may be referred to a serving cell (SCell) or a primary cell (PCell).

According to various embodiments of the disclosure, in operation 625, the UE 601 may be configured to perform LTE V2X sidelink communication and may select or reselect a suitable LTE cell and acquire desired system information including LTE V2X sidelink configuration information. The UE 601 may perform LTE V2X sidelink communication on the basis of the acquired LTE V2X sidelink configuration information.

According to various embodiments of the disclosure, in operation 625, the UE 601 is configured to perform both the LTE V2X sidelink communication and the NR V2X sidelink communication, but may select or reselect a suitable LTE cell and acquire system information including only the desired LTE V2X sidelink configuration information. The UE 601 may perform LTE V2X sidelink communication on the basis of the acquired LTE V2X sidelink configuration information. Specifically, in operation 625, in case that the existence of SIBx described through a scheduling information list (SchedulingInfoList) in SIB1 (SystemInformationBlockType1) received from the cell (Scell or PCell) is indicated, the UE 601 in the RRC inactive mode may acquire SIBx. Alternatively, in case that valid SIBx is not stored, the UE 601 may acquire SIBx. In case that the LTE eNB 603 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/logical channel (LCH) configuration information. Alternatively, sidelink bearer configuration information for one PC5 QoS profile may include mapping information for one or a plurality of SLRBs and/or PDCP/RLC/LCH configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

[Table 1] below indicates standardized mapping of PQIs and QoS characteristics.

TABLE 1

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR (NOTE 1) | 3 | 20 ms | $10^{-4}$ | N/A | 2000 ms | Platooning between UEs - Higher degree of automation; Platooning between UE and RSU - Higher degree of automation |
| 2 | | 4 | 50 ms | $10^{-2}$ | N/A | 2000 ms | Sensor sharing - higher degree of automation |
| 3 | | 3 | 100 ms | $10^{-4}$ | N/A | 2000 ms | Information sharing for automated driving - between UEs or UE and RSU - higher degree of automation |
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning - information sharing with RSU |

TABLE 1-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 82 | Delay Critical GBR (NOTE 1) | 3 | 10 ms | $10^{-4}$ | 2000 bytes | | Cooperative collision avoidance; Sensor sharing - Higher degree of automation; Video sharing - higher degree of automation |
| 83 | | 2 | 3 ms | $10^{-5}$ | 2000 byte | 2000 ms | Emergency trajectory alignment; Sensor sharing - Higher degree of automation |

In operation 630, packet(s) for transmitting NR V2X sidelink communication may be generated or arrive and configured to perform NR V2X sidelink communication. Further, the performance of NR V2X sidelink communication in a specific frequency may be indicated.

According to various embodiments of the disclosure, operation 630 may be performed in operation 625.

In operation 635, higher-layer devices may configure PC5 QoS profile(s) for packet(s) (for example, PQI) and transfer packets and PC5 QoS profile(s) therefor to access stratum (AS) devices. In case that there is no indication indicating the performance of NR V2X sidelink communication in a specific frequency in operation 630, the indication may be made in operation 635.

In operation 640, the AS devices may determine whether sidelink bearer configuration information for PC5 QoS profile(s) for the packets received in operation 635 exists in SIBx received in operation 625. According to an embodiment, the AS device may identify whether a sidelink bearer identifier mapped to the PC5 QoS profile(s) (for example, PQI and/or range) or a sidelink bearer therefor is configured. According to an embodiment, it is because the LTE eNB may not include sidelink bearer configuration information for PC5 QoS profile(s) due to restriction on the SIBx size. The sidelink bearer configuration information for PC5 QoS profile(s) may be broadcasted through SIBx regardless of a frequency or may be separately broadcasted for each frequency. In case that the sidelink bearer configuration information is broadcasted for each frequency, it may be determined whether the sidelink bearer configuration information for the PC5 QoS profile(s) in the frequency indicated by the above-described operation exists in the received SIBx.

In operation 645, the AS devices may determine whether the specific frequency indicated by the higher-layer devices in operation 630 or operation 635 is in coverage or whether the specific frequency is included in SIBx.

In operation 650, the AS devices may determine whether the specific frequency includes resource information for transmitting NR V2X sidelink communication. Further, it may be determined whether the result of sensing in the corresponding resource information is available. Resource information according to this embodiment may refer to a generally used transmission resource pool (for example, v2x-CommTxPoolNormal, v2x-CommTxPoolNormalCommon) or an exceptionally used transmission resource pool (for example, v2x-CommTxPoolExceptional).

In case that operation 640, operation 645, or operation 650 is not satisfied, the UE 601 may acquire system information broadcasted by the NR gNB 604 in operation 655. The system information may refer to system information including NR V2X sidelink communication configuration information. The UE 601 may perform a cell selection/reselection procedure and acquire the system information in case that there is no neighboring LTE cell that satisfies operation 640, operation 645, or operation 650. The system information may be system information including NR sidelink communication configuration information that satisfies the above-described operation. An embodiment of the disclosure proposes a method by which the UE 601 camps on the LTE cell, acquires only the system information from the NR cell, and uses information included in the system information without finally selecting/reselecting the NR cell. That is, since the UE 601 does not finally perform inter-RAT cell selection/reselection, the RRC inactive mode can be maintained in operation 656. In addition, the UE 601 may acquire only system information including NR V2X sidelink communication configuration information broadcasted by a second LTE cell rather than a first LTE cell which the UE currently camps on to perform NR sidelink communication without intra-RAT cell selection/reselection. For example, in case that there is the second LTE cell sharing the NR V2X sidelink communication configuration information and the LTE V2X sidelink communication configuration information in one frequency, the UE 601 may acquire only the NR V2X sidelink communication configuration information from the second LTE cell operating in the corresponding frequency. The corresponding frequency may be a frequency indicated to perform NR V2X sidelink communication in operation 630.

In operation 660, the UE 601 may perform NR V2X sidelink communication (transmit NR V2X sidelink packet(s)) with another UE 602 on the basis of the system information received in operation 655. In case that operation 640, operation 645, or operation 650 is not satisfied, the cell selection/reselection procedure is not performed (that is, operation 655 is not performed), and operation 660 may be performed using the preconfiguration while the RRC inactive mode is maintained in operation 656. According to an embodiment, the UE 601 may perform NR V2X sidelink communication with another UE 602 through one resource pool in a transmission resource pool list (for example, v2x-CommTxPoolList) included in the SL-V2X-preconfiguration. Alternatively, in case that operation 640, operation 645, or operation 650 is not satisfied since the cell selection/reselection procedure is performed but a suitable LTE cell or NR cell cannot be discovered, the UE 601 may perform operation 660 using the preconfiguration while maintaining the RRC inactive mode in operation 656.

Figure 7:
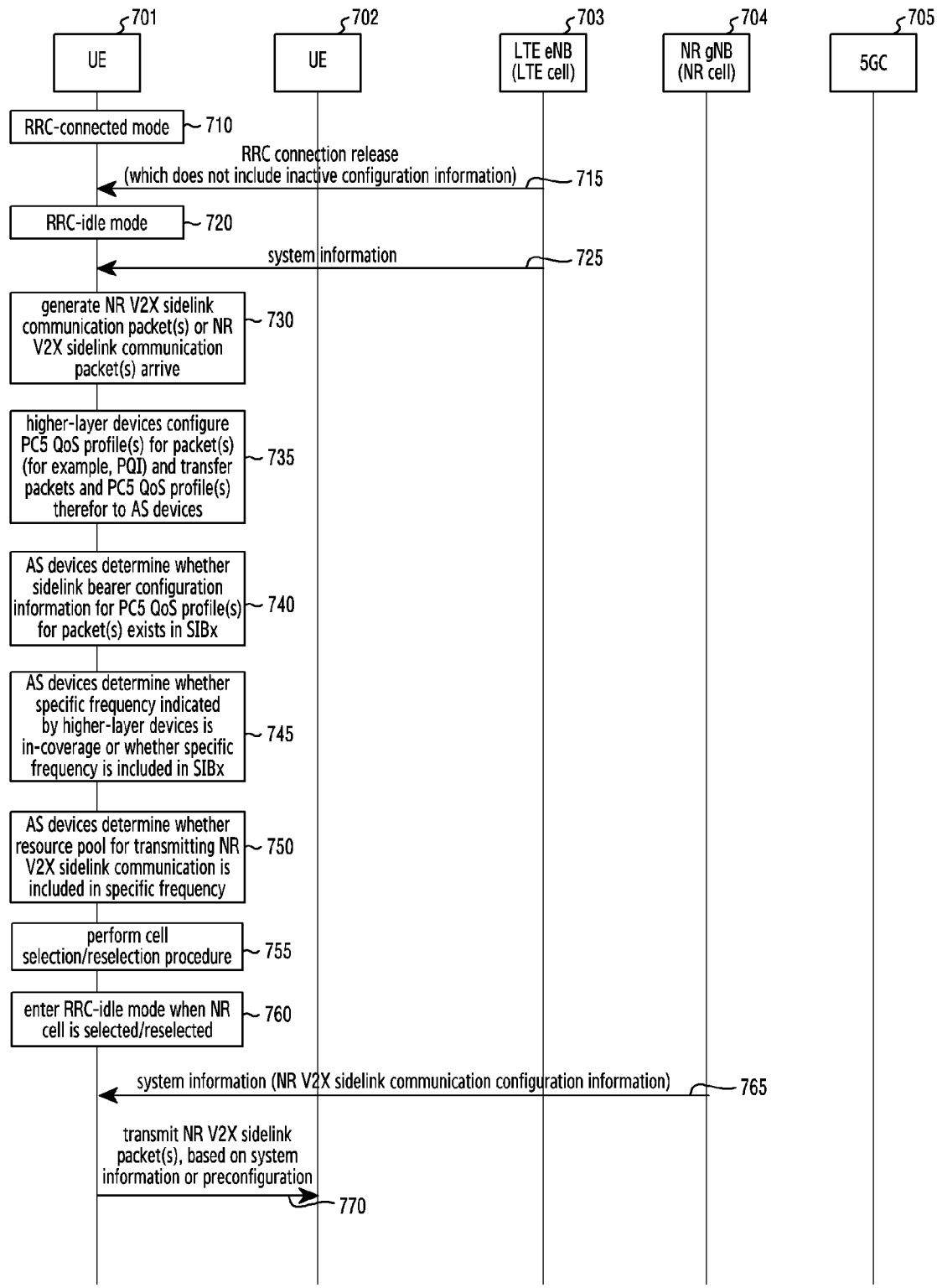
FIG. 7 illustrates an example of a procedure in which UE switches from an RRC-connected mode (RRC_CONNECTED) to an RRC-idle mode (RRC_IDLE) with an LTE eNB (ng-eNB) connected to a 5GC and a procedure in which a UE in an RRC-inactive mode performs NR V2X sidelink communication in a wireless communication system according to various embodiments of the disclosure.

FIG. 7 illustrates an example of a procedure in which the UE switches from an RRC-connected mode (RRC_CONNECTED) to an RRC-idle mode (RRC_IDLE) with an LTE eNB (ng-eNB) connected to a 5GC and a procedure in which a UE in an RRC-inactive mode performs NR V2X sidelink communication in a wireless communication system according to various embodiments of the disclosure.

A UE 701 according to an embodiment of the disclosure may refer to a vehicle UE or a pedestrian UE. The UE 701 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The LTE eNB 703 according to an embodiment of the disclosure may periodically broadcast system information related to LTE V2X sidelink configuration information and/or system information related to NR V2X sidelink configuration information.

In case that the UE 701 according to an embodiment of the disclosure is configured to simultaneously transmit the NR V2X sidelink communication and the LTE V2X sidelink communication, if the UE does not simultaneously acquire NR V2X sidelink communication configuration information and LTE V2X sidelink communication configuration information from one cell, the UE may camp on one of a cell providing only the NR V2X sidelink communication configuration information or a cell providing only the LTE V2X sidelink communication configuration information. In case that at least one second cell 704 that satisfies a cell selection condition (S criterion) for a frequency in which V2X sidelink communication is configured is detected in the state in which the UE 701 camps on the first cell 703 providing only one of the NR V2X sidelink communication configuration information or the LTE V2X sidelink communication configuration information, it may be determined whether the UE 701 is in coverage for at least one second cell 704 providing the LTE V2X sidelink communication configuration information or the NR V2X sidelink communication configuration information which the first cell 701 cannot provide. In case that it is determined that the UE 701 is in coverage for the second cell 704, the UE 701 may acquire only system information including the V2X sidelink communication configuration information from the second cell 704 without cell selection/reselection of the detected second cell 704. The V2X sidelink communication configuration information included in the system information acquired from the second cell 704 is LTE V2X sidelink communication configuration information or NR V2X sidelink communication configuration information which the first cell 703 providing only one of the NR V2X sidelink communication configuration information or LTE V2X sidelink communication configuration information cannot provide. In case that the UE 701 is not in coverage for the second cell 704, that is, in case that the UE 701 is out of coverage (OOC) for the second cell 704, the UE 701 may use a preconfiguration.

Referring to FIG. 7, the UE 701 may transmit and receive data to and from the LTE eNB 703 connected to a 5GC in an RRC-connected mode (RRC_CONNECTED) in operation 710.

In case that there is no transmission/reception of data for a predetermined reason or for a predetermined time, the LTE eNB 703 may transmit an RRC connection release message (RRCConnectionRelease message) which does not include inactive configuration information (RRC-InactiveConfig) in operation 715.

The UE 701 receiving the RRC connection release message may switch to an RRC-idle mode (RRC_IDLE) in operation 720.

The UE 701 in the RRC-inactive mode may discover a suitable LTE cell 703 through a cell selection procedure or a cell reselection procedure and camp on the discovered cell to acquire system information in operation 725. According to an embodiment, system information may be one or a plurality of SIBx including MIB1, SIB1, SIB2, SIB3, SIB4, SIB5, SIB26, and/or NR V2X sidelink configuration information defined/introduced for NR V2X sidelink communication. The cell which the UE camps on may be referred to a serving cell (SCell) or a primary cell (PCell).

According to various embodiments of the disclosure, in operation 725, the UE 701 may be configured to perform LTE V2X sidelink communication and may select or reselect a suitable LTE cell and acquire system information including desired LTE V2X sidelink configuration information. The UE 701 may perform LTE V2X sidelink communication on the basis of the acquired LTE V2X sidelink configuration information.

According to various embodiments of the disclosure, in operation 725, the UE 701 is configured to perform both the LTE V2X sidelink communication and the NR V2X sidelink communication, but may select or reselect a suitable LTE cell and acquire system information including only the desired LTE V2X sidelink configuration information. The UE 701 may perform LTE V2X sidelink communication on the basis of the acquired LTE V2X sidelink configuration information.

Specifically, in operation 725, in case that the existence of SIBx described through a scheduling information list (SchedulingInfoList) in SIB1 (SystemInformationBlockType1) received from the cell (Scell or PCell) is indicated, the UE 601 in the RRC inactive mode may acquire SIBx. Alternatively, in case that valid SIBx is not stored, the UE 701 may acquire SIBx. In case that the LTE eNB 703 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-psschTxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/logical channel (LCH) configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 730, packet(s) for transmitting NR V2X sidelink communication may be generated or arrive and configured to perform NR V2X sidelink communication. Further, the performance of NR V2X sidelink communication in a specific frequency may be indicated.

According to various embodiments of the disclosure, operation 730 may be performed in operation 725. In operation 735, higher-layer devices may configure PC5 QoS profile(s) for packet(s) (for example, PQI) and transfer packets and PC5 QoS profile(s) therefor to access stratum (AS) devices. In case that there is no indication indicating the performance of NR V2X sidelink communication in a specific frequency in operation 730, the indication may be made in operation 735.

In operation 740, the AS devices may determine whether sidelink bearer configuration information for PC5 QoS profile(s) for the packets received in operation 735 exists in SIBx received in operation 725. According to an embodiment, the AS device may identify whether a sidelink bearer identifier mapped to the PC5 QoS profile(s) (for example, PQI and/or range) or a sidelink bearer therefor is configured. According to an embodiment, it is because the LTE eNB 703 may not include sidelink bearer configuration information for PC5 QoS profile(s) due to restriction on the SIBx size. The sidelink bearer configuration information for PC5 QoS profile(s) may be broadcasted through SIBx regardless of a frequency or may be separately broadcasted for each frequency. In case that the sidelink bearer configuration information is broadcasted for each frequency, it may be determined whether the sidelink bearer configuration information for the PC5 QoS profile(s) in the frequency indicated by the above-described operation exists in the received SIBx.

In operation 745, the AS devices may determine whether the specific frequency indicated by the higher-layer devices in operation 730 or operation 735 is in coverage or whether the specific frequency is included in SIBx.

In operation 750, it may be determined whether resource information for transmitting NR V2X sidelink communication is included in the specific frequency. Further, it may be determined whether the result of sensing in the corresponding resource information is available. Resource information according to this embodiment may refer to a generally used transmission resource pool (for example, v2x-CommTxPoolNormal, v2x-CommTxPoolNormalCommon) or an exceptionally used transmission resource pool (for example, v2x-CommTxPoolExceptional).

In case that operation 740, operation 745, or operation 750 is not satisfied, the UE 701 may perform a cell selection procedure or a cell reselection procedure in operation 755. In case that a suitable NR cell 704 is finally selected/reselected through the cell selection procedure or the cell reselection procedure, the UE 701 may enter an RRC-idle mode in operation 760.

In case that operation 740, operation 745, or operation 750 is not satisfied, the UE 701 may acquire only system information broadcasted by the NR cell 704 without selection/reselection of the NR cell 704 in operation 755. The system information may refer to system information including NR V2X sidelink communication configuration information. The system information may be system information including NR sidelink communication configuration information that satisfies the above-described operation. An embodiment of the disclosure proposes a method by which the UE 701 camps on the LTE cell 703, acquires only the system information from the NR cell 704, and uses information included in the system information without finally selecting/reselecting the NR cell 704. That is, the UE 701 may not finally perform inter-RAT cell selection/reselection.

In addition, the UE 701 may acquire only system information including NR V2X sidelink communication configuration information broadcasted by a second LTE cell rather than a first LTE cell which the UE currently camps on to perform NR sidelink communication without intra-RAT cell selection/reselection. For example, in case that there is the second LTE cell sharing the NR V2X sidelink communication configuration information and the LTE V2X sidelink communication configuration information in one frequency, the UE 701 may acquire only the NR V2X sidelink communication configuration information from the second LTE cell operating in the corresponding frequency. The corresponding frequency may be a frequency indicated to perform NR V2X sidelink communication in operation 730.

In operation 765, the UE 701 may acquire system information broadcasted by the selected/reselected NR cell 704. In case that the NR cell 704 periodically performs broadcasting, the UE 701 may acquire system information broadcasted by the NR cell 704 according to a corresponding period of the NR cell 704. In case that the NR cell 704 signals system information in an on-demand type, the UE may make a request for the corresponding system information to the NR gNB and acquire the same. According to an embodiment, the UE 701 may transmit a request through a preamble (msg1) or through an RRC system information request message (RRCSystemInfoRequest message, msg3) in a random access procedure with the NR cell BS 704 and acquire the system information. According to an embodiment, the system information may be system information including NR V2X sidelink communication configuration information that satisfies the above-described operation.

In operation 770, the UE 701 may perform NR V2X sidelink communication (transmit NR V2X sidelink packet(s)) with another UE 702 on the basis of the system information received in operation 765. Alternatively, in case that operation 740, operation 745, or operation 750 is not satisfied since the cell selection/reselection is performed but a suitable LTE cell or NR cell has not been discovered, operation 770 may be performed using a preconfiguration. According to an embodiment, the UE 701 may perform NR V2X sidelink communication with another UE 702 through one resource pool in a transmission resource pool list (for example, v2x-CommTxPoolList) included in the SL-V2X-preconfiguration. Alternatively, the UE 701 may perform operation 770 using a preconfiguration without a cell selection/reselection procedure (That is, without operation 755).

Figure 8:
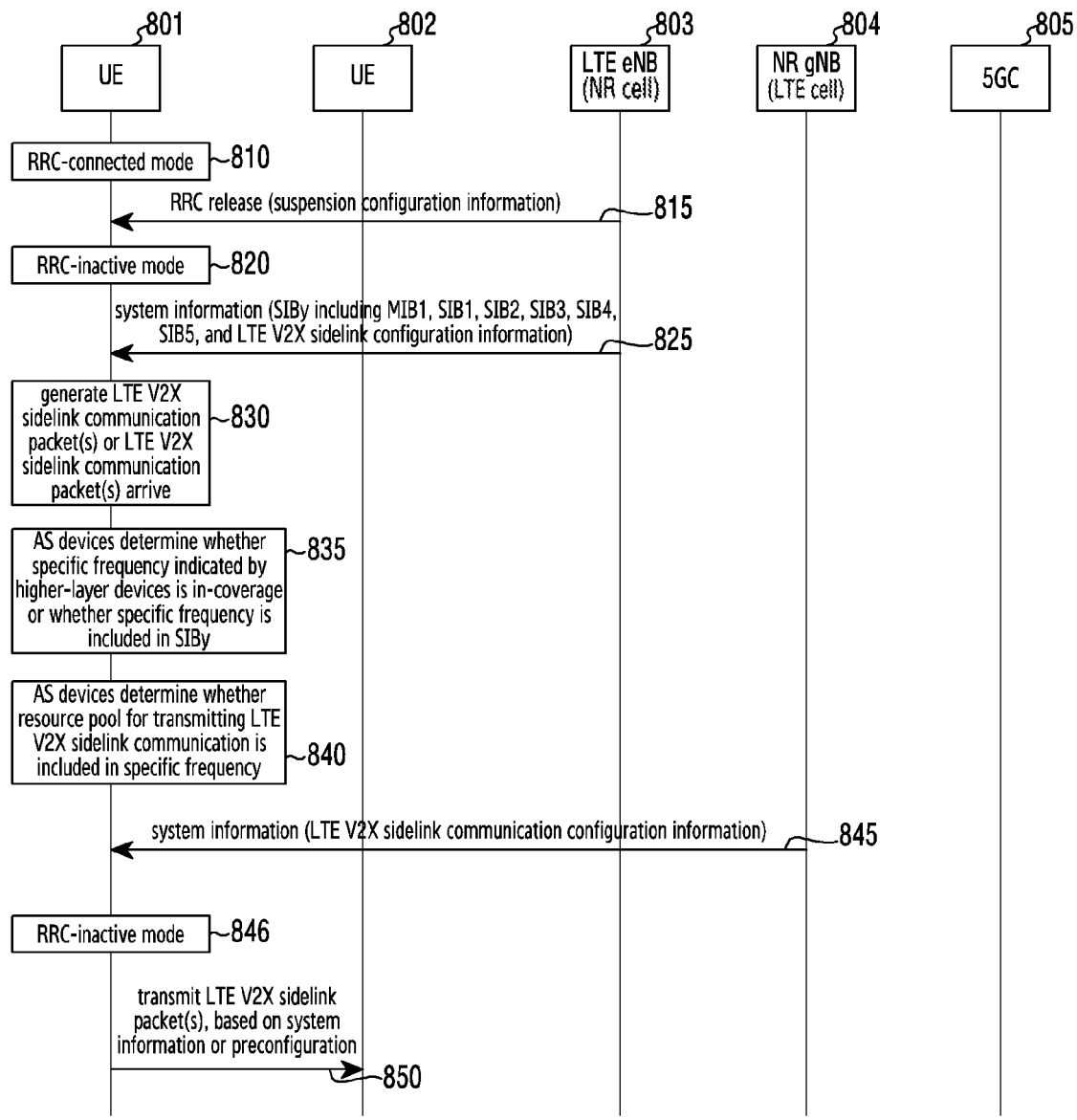
FIG. 8 illustrates an example of a procedure in which the UE switches from an RRC-connected mode (RRC_CONNECTED) to an RRC-inactive mode (RRC_INACTIVE) with an NR next generation node B (gNB) connected to a 5GC and a procedure in which a UE in an RRC-inactive mode performs LTE V2X sidelink communication in a wireless communication system according to various embodiments of the disclosure.

FIG. 8 illustrates an example of a procedure in which the UE switches from an RRC-connected mode (RRC_CONNECTED) to an RRC-inactive mode (RRC_INACTIVE) with an NR next generation node B (gNB) connected to a 5GC and a procedure in which a UE in an RRC-inactive mode performs LTE V2X sidelink communication in a wireless communication system according to various embodiments of the disclosure.

A UE 801 according to an embodiment of the disclosure may refer to a vehicle UE or a pedestrian UE. The UE may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The NR gNB according to an embodiment of the disclosure may broadcast system information related to LTE V2X sidelink configuration information and/or system information related to NR V2X sidelink configuration information periodically or in an on-demand type.

In case that the UE 801 according to an embodiment of the disclosure is configured to simultaneously transmit the NR V2X sidelink communication and the LTE V2X sidelink communication, if the UE does not simultaneously acquire NR V2X sidelink communication configuration information and LTE V2X sidelink communication configuration information from one cell, the UE may camp on one of a cell providing only the NR V2X sidelink communication configuration information or a cell providing only the LTE V2X sidelink communication configuration information. In case that at least one second cell 804 that satisfies a cell selection condition (S criterion) for a frequency in which V2X sidelink communication is configured is detected in the state in which the UE 801 camps on the first cell 803 providing only one of the NR V2X sidelink communication configuration information or the LTE V2X sidelink communication configuration information, it may be determined whether the UE 801 is in coverage for at least one second cell 804 providing the LTE V2X sidelink communication configuration information or the NR V2X sidelink communication configuration information which the first cell 803 cannot provide. In case that it is determined that the UE 801 is in coverage for the second cell 804, the UE 801 may acquire only system information including the V2X sidelink communication configuration information from the second cell 804 without cell selection/reselection of the detected second cell 804. The V2X sidelink communication configuration information included in the system information acquired from the second cell 704 is LTE V2X sidelink communication configuration information or NR V2X sidelink communication configuration information which the first cell 803 providing only one of the NR V2X sidelink communication configuration information or LTE V2X sidelink communication configuration information cannot provide. In case that the UE 801 is not in coverage for the second cell 804, that is, in case that the UE 801 is out of coverage (OOC) for the second cell 804, the UE 801 may use a preconfiguration.

Referring to FIG. 8, the UE 801 may transmit and receive data to and from the NR gNB 803 connected to a 5GC in an RRC-connected mode (RRC_CONNECTED) in operation 810.

In case that there is no transmission/reception of data for a predetermined reason or for a predetermined time, the NR gNB 803 may transmit an RRC connection release message (RRCConnectionRelease message) including suspension configuration information (suspendConfig) in operation 815.

The UE 801 receiving the RRC connection release message may switch to an RRC inactive mode (RRC_INACTIVE) in operation 820.

The UE 801 in the RRC-inactive mode may discover a suitable NR cell 803 through a cell selection procedure or a cell reselection procedure and camp on the discovered cell to acquire system information in operation 825. According to an embodiment, system information may be one or a plurality of SIBy including MIB1 (MasterInformationBlockType1), SIB1, SIB2, SIB3, SIB4, SIB5, and LTE V2X sidelink configuration information defined/introduced for LTE V2X sidelink communication. The cell which the UE camps on may be referred to a serving cell (SCell) or a primary cell (PCell).

According to various embodiments of the disclosure, in operation 825, the UE 801 may be configured to perform NR V2X sidelink communication and may select or reselect a suitable NR cell and acquire system information including desired NR V2X sidelink configuration information. The UE 801 may perform NR V2X sidelink communication on the basis of the acquired NR V2X sidelink configuration information.

According to various embodiments of the disclosure, in operation 825, the UE 801 is configured to perform both LTE V2X sidelink communication and NR V2X sidelink communication, the UE 801 may select or reselect a suitable NR cell and acquire system information including only desired NR V2X sidelink configuration information. The UE 801 may perform NR V2X sidelink communication on the basis of the acquired NR V2X sidelink configuration information.

Specifically, in operation 825, in case that the existence of SIBy described through a system information scheduling information list (si-SchedulingInfo) in SIB1 (SystemInformationBlockType1) received from the cell (Scell or PCell) is indicated, the UE 801 in the RRC-inactive mode may acquire SIBy. Alternatively, in case that valid SIBy is not stored, the UE 801 may acquire SIBy. In case that the NR gNB 803 broadcasts SIBy, SIBy selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR.

In operation 830, packets for transmitting LTE V2X sidelink communication may be generated or arrive and may be configured to perform LTE V2X sidelink communication. Further, an indication indicating the performance of LTE V2X sidelink communication in a specific frequency may be made.

According to various embodiments of the disclosure, operation 830 may be performed in operation 825.

In operation 835, the AS devices may determine whether the specific frequency indicated by the higher-layer devices in operation 830 is in coverage or whether the specific frequency is included in SIBy.

In operation 840, the AS devices may determine whether resource information for transmitting LTE V2X sidelink communication is included in the specific frequency. Further, it may be determined whether the result of sensing in the corresponding resource information is available. Resource information according to this embodiment may refer to a generally used transmission resource pool (for example, v2x-CommTxPoolNormal, v2x-CommTxPoolNormalCommon) or an exceptionally used transmission resource pool (for example, v2x-CommTxPoolExceptional).

In case that operation 835 or operation 840 is not satisfied, the UE may acquire system information broadcasted by the LTE eNB 804 in operation 845. The system information may be system information including LTE V2X sidelink communication configuration information that satisfies the above-described operation. According to an embodiment, the system information may be SIB21 or SIB26. In case that there is no neighboring NR cell that satisfies operation 835 or operation 840 on the basis of the cell selection/reselection procedure, the UE 801 may acquire the system information. An embodiment of the disclosure proposes a method by which the UE 801 camps on the NR cell, acquires only the system information from the LTE cell, and uses information included in the system information without finally selecting/reselecting the LTE cell. That is, since the UE 801 does not finally perform inter-RAT cell selection/reselection, the RRC-inactive mode can be maintained in operation 846. In addition, the UE 801 may acquire only system information including LTE V2X sidelink communication configuration information broadcasted by a second NR cell rather than a first NR cell which the UE currently camps on to perform LTE sidelink communication without intra-RAT cell selection/reselection. For example, in case that there is the second NR cell sharing the NR V2X sidelink communication configuration information and the LTE V2X sidelink communication configuration information in one frequency, the UE 801 may acquire only the LTE V2X sidelink communication configuration information from the second NR cell operating in the corresponding frequency. The corresponding frequency may be a frequency indicated to perform LTE V2X sidelink communication in operation 830.

In operation 850, the UE 801 may perform LTE V2X sidelink communication (transmit LTE V2X sidelink packet(s)) with another UE 802 on the basis of the system information received in operation 845. In case that operation 835 or operation 840 is not satisfied, the cell selection/reselection procedure is not performed (that is, operation 845 is not performed), and operation 850 may be performed using the preconfiguration while the RRC-inactive mode is maintained in operation 846. According to an embodiment, the UE 801 may perform LTE V2X sidelink communication with another UE 802 through one resource pool in a transmission resource pool list (for example, v2x-CommTxPool-List) included in the SL-V2X-preconfiguration. Alternatively, in case that operation 835 or operation 840 is not satisfied since the cell selection/reselection procedure is performed but a suitable LTE cell or NR cell cannot be discovered, the UE 801 may perform operation 850 using the preconfiguration while maintaining the RRC-inactive mode in operation 846.

Figure 9:
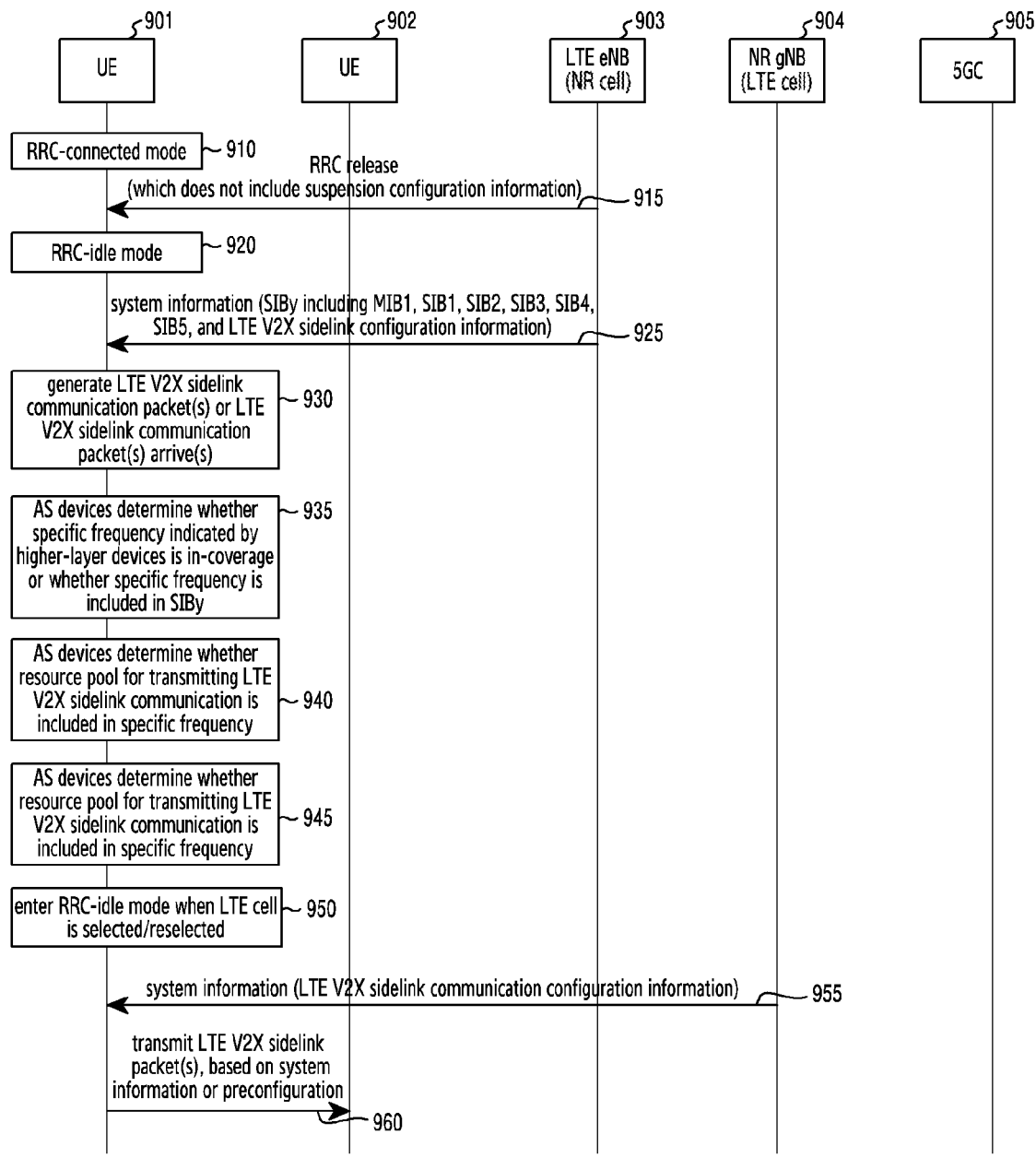
FIG. 9 illustrates an example of a procedure in which the UE switches from an RRC-connected mode (RRC_CONNECTED) to an RRC-idle mode (RRC_IDLE) with an NR gNB connected to a 5GC and a procedure in which a UE in an RRC-idle mode performs LTE V2X sidelink communication in a wireless communication system according to various embodiments of the disclosure.

FIG. 9 illustrates an example of a procedure in which the UE switches from an RRC-connected mode (RRC_CONNECTED) to an RRC-idle mode (RRC_IDLE) with an NR gNB connected to a 5GC and a procedure in which a UE in an RRC-idle mode performs LTE V2X sidelink communication in a wireless communication system according to various embodiments of the disclosure.

A UE 901 according to an embodiment of the disclosure may refer to a vehicle UE or a pedestrian UE. The UE 901 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The NR gNB 903 according to an embodiment of the disclosure may broadcast system information related to LTE V2X sidelink configuration information and/or system information related to NR V2X sidelink configuration information periodically or in an on-demand type.

In case that the UE 901 according to an embodiment of the disclosure is configured to simultaneously transmit the NR V2X sidelink communication and the LTE V2X sidelink communication, if the UE does not simultaneously acquire NR V2X sidelink communication configuration information and LTE V2X sidelink communication configuration information from one cell, the UE may camp on one of a cell providing only the NR V2X sidelink communication configuration information or a cell providing only the LTE V2X sidelink communication configuration information. In case that at least one second cell 904 that satisfies a cell selection condition (S criterion) for a frequency in which V2X sidelink communication is configured is detected in the state in which the UE 901 camps on the first cell 903 providing only one of the NR V2X sidelink communication configuration information or the LTE V2X sidelink communication configuration information, it may be determined whether the UE 901 is in coverage for at least one second cell 904 providing the LTE V2X sidelink communication configuration information or the NR V2X sidelink communication configuration information which the first cell 903 cannot provide. In case that it is determined that the UE 901 is in coverage for the second cell 904, the UE 901 may acquire only system information including the V2X sidelink communication configuration information from the second cell 904 without cell selection/reselection of the detected second cell 904. The V2X sidelink communication configuration information included in the system information acquired from the second cell 904 is LTE V2X sidelink communication configuration information or NR V2X sidelink communication configuration information which the first cell 903 providing only one of the NR V2X sidelink communication configuration information or LTE V2X sidelink communication configuration information cannot provide. In case that the UE 901 is not in coverage for the second cell 904, that is, in case that the UE 901 is out of coverage (OOC) for the second cell 904, the UE 901 may use a preconfiguration.

Referring to FIG. 9, the UE 901 may transmit and receive data to and from the NR gNB 903 connected to a 5GC in an RRC-connected mode (RRC_CONNECTED) in operation 910.

In case that there is no transmission/reception of data for a predetermined reason or for a predetermined time, the BS 903 may transmit an RRC release message (RRCRelease message) including suspension configuration information (suspendConfig) in operation 915.

The UE 901 receiving the RRC connection release message may switch to an RRC-idle mode (RRC_IDLE) in operation 920.

The UE 901 in the RRC-idle mode may discover a suitable NR cell 903 through a cell selection procedure or a cell reselection procedure and camp on the discovered cell to acquire system information in operation 925. According to an embodiment, the system information may be one or a plurality of SIBy including MIB1, SIB1, SIB2, SIB3, SIB4, SIB5, and LTE V2X sidelink configuration information defined/introduced for LTE V2X sidelink communication. The cell which the UE camps on may be referred to a serving cell (SCell) or a primary cell (PCell).

According to various embodiments of the disclosure, in operation 925, the UE 901 may be configured to perform NR V2X sidelink communication and may select or reselect a suitable NR cell and acquire system information including desired NR V2X sidelink configuration information. The UE 901 may perform NR V2X sidelink communication on the basis of the acquired NR V2X sidelink configuration information.

According to various embodiments of the disclosure, in operation 925, the UE 901 is configured to perform both LTE V2X sidelink communication and NR V2X sidelink communication, the UE 901 may select or reselect a suitable NR cell and acquire system information including only desired NR V2X sidelink configuration information. The UE 901 may perform NR V2X sidelink communication on the basis of the acquired NR V2X sidelink configuration information.

Specifically, in operation 925, in case that the existence of SIBy described through a system information scheduling information list (si-SchedulingInfo) in SIB1 (SystemInformationBlockType1) received from the cell (Scell or PCell) is indicated, the UE 901 in the RRC-inactive mode may acquire SIBy. Alternatively, in case that valid SIBy is not stored, the UE 901 may acquire SIBy. In case that the NR gNB 903 broadcasts SIBy, SIBy selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR.

In operation 930, packets for transmitting LTE V2X sidelink communication may be generated or arrive and may be configured to perform LTE V2X sidelink communication. Further, an indication indicating the performance of LTE V2X sidelink communication in a specific frequency may be made.

According to various embodiments of the disclosure, operation 930 may be performed in operation 925.

In operation 935, the AS devices may determine whether the specific frequency indicated by the higher-layer devices in operation 930 is in coverage or whether the specific frequency is included in SIBy.

In operation 940, the AS devices may determine whether resource information for transmitting LTE V2X sidelink communication is included in the specific frequency. Further, it may be determined whether the result of sensing in the corresponding resource information is available. Resource information according to this embodiment may refer to a generally used transmission resource pool (for example, v2x-CommTxPoolNormal, v2x-CommTxPoolNormalCommon) or an exceptionally used transmission resource pool (for example, v2x-CommTxPoolExceptional).

In case that operation 935 or operation 940 is not satisfied, the cell selection procedure or the cell reselection procedure may be performed in operation 945. In case that a suitable LTE cell 904 is finally selected/reselected through the cell selection procedure or the cell reselection procedure, the UE 901 may enter an RRC-idle mode in operation 950.

In case that operation 940 or operation 945 is not satisfied, the UE 901 may acquire only system information broadcasted by the LTE cell 904 without selection/reselection of the LTE cell 904 in operation 945. The system information may refer to system information including LTE V2X sidelink communication configuration information. The system information may be system information including LTE sidelink communication configuration information that satisfies the above-described operation. An embodiment of the disclosure proposes a method by which the UE 901 camps on the NR cell 903, acquires only the system information from the LTE cell 904, and uses information included in the system information without finally selecting/reselecting the LTE cell 904. That is, the UE 901 may not finally perform inter-RAT cell selection/reselection.

In addition, the UE 901 may acquire only system information including LTE V2X sidelink communication configuration information broadcasted by a second NR cell rather than a first NR cell which the UE currently camps on to perform LTE sidelink communication without intra-RAT cell selection/reselection. For example, in case that there is the second NR cell sharing the NR V2X sidelink communication configuration information and the LTE V2X sidelink communication configuration information in one frequency, the UE 901 may acquire only the LTE V2X sidelink communication configuration information from the second NR cell operating in the corresponding frequency. The corresponding frequency may be a frequency indicated to perform LTE V2X sidelink communication in operation 930.

In operation 955, the UE 901 may acquire system information broadcasted by the selected/reselected LTE eNB 904. The system information may be system information including LTE V2X sidelink communication configuration information that satisfies the above-described operation. According to an embodiment, the system information may be SIB21 or SIB26. In case that there is no neighboring NR cell that satisfies operation 935 or operation 940 on the basis of the cell selection/reselection procedure, the UE 901 may acquire the system information.

In operation 960, the UE 901 may perform LTE V2X sidelink communication (transmit LTE V2X sidelink packet(s)) with another UE 902 on the basis of the system information received in operation 955. Alternatively, in case that operation 940 is not satisfied since the cell selection/reselection is performed but a suitable LTE cell or NR cell has not been discovered, operation 960 may be performed using a preconfiguration. According to an embodiment, the UE 901 may perform LTE V2X sidelink communication with another UE 902 through one resource pool in a transmission resource pool list (for example, v2x-CommTxPoolList) included in the SL-V2X-preconfiguration. Alternatively, operation 960 may be performed using a preconfiguration without a cell selection/reselection procedure (That is, without operation 945).

Figure 10:
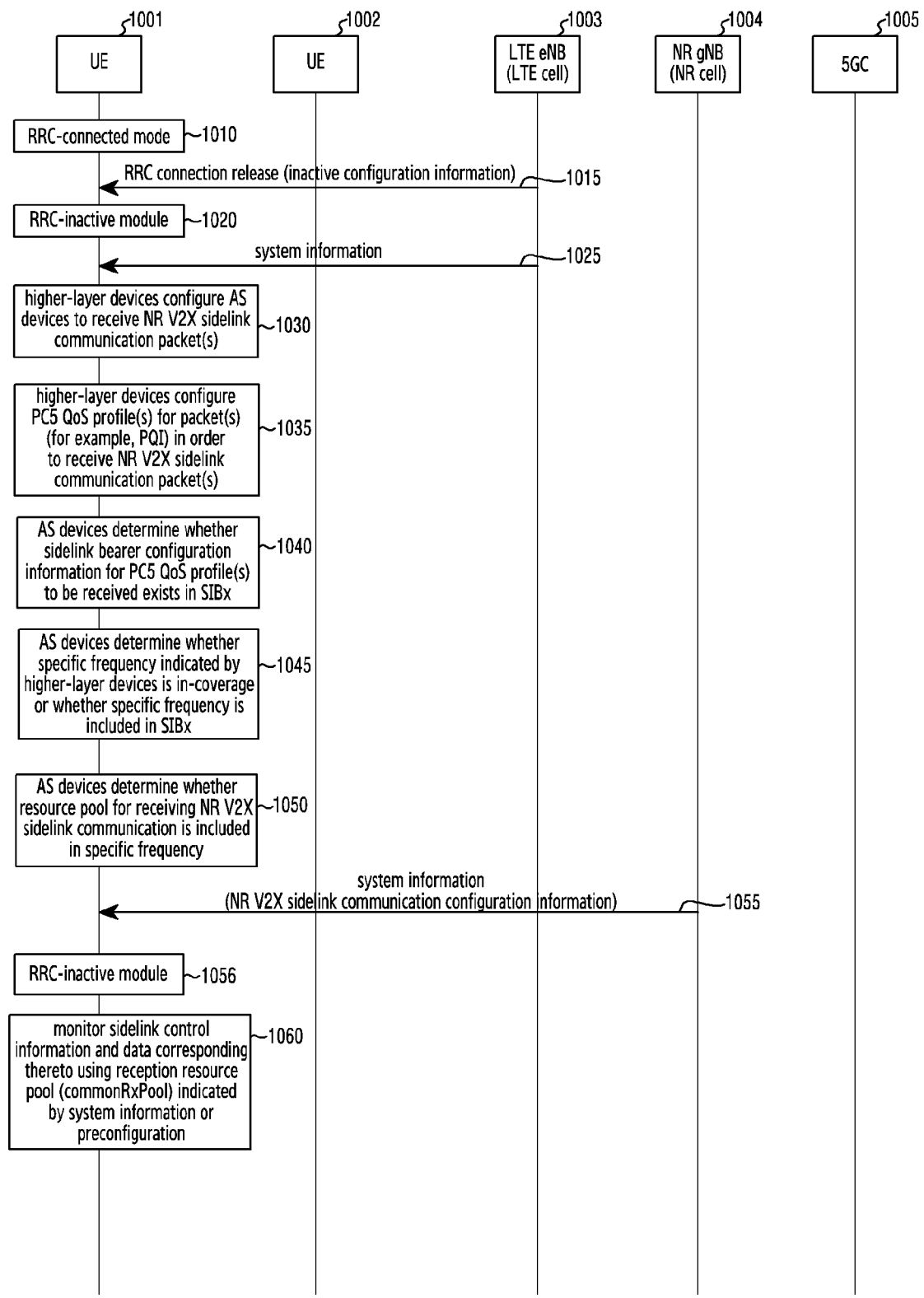
FIG. 10 illustrates an example of a procedure in which the UE switches from an RRC-connected mode (RRC_CONNECTED) to an RRC-inactive mode (RRC_INACTIVE) with an LTE eNB (ng-eNB) connected to a 5GC and a procedure in which a UE in an RRC-inactive mode performs NR V2X sidelink communication in a wireless communication system according to various embodiments of the disclosure.

FIG. 10 illustrates an example of a procedure in which the UE switches from an RRC-connected mode (RRC_CONNECTED) to an RRC-inactive mode (RRC_INACTIVE) with an LTE eNB (ng-eNB) connected to a 5GC and a procedure in which a UE in an RRC-inactive mode performs NR V2X sidelink communication in a wireless communication system according to various embodiments of the disclosure.

A UE 1001 according to an embodiment of the disclosure may refer to a vehicle UE or a pedestrian UE. The UE 1001 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The LTE eNB 1003 according to an embodiment of the disclosure may periodically broadcast system information related to LTE V2X sidelink configuration information and/or system information related to NR V2X sidelink configuration information.

Referring to FIG. 10, the UE 1001 may transmit and receive data to and from the LTE eNB 1003 connected to a 5GC in an RRC-connected mode (RRC_CONNECTED) in operation 1010.

In case that the UE 1001 has no transmission/reception of data for a predetermined reason or for a predetermined time, the LTE eNB 1003 may transmit an RRC connection release message (RRCConnectionRelease message) including inactive configuration information (RRC-InactiveConfig) in operation 1015.

The UE 1001 receiving the RRC connection release message may switch to an RRC-inactive mode (RRC_I-NACTIVE) in operation 1020.

The UE 1001 in the RRC-inactive mode may discover a suitable LTE cell 1003 through a cell selection procedure or a cell reselection procedure and camp on the discovered cell to acquire system information in operation 1025. According to an embodiment, the system information may be one or a plurality of SIBx including MIB1, SIB1, SIB2, SIB3, SIB4, SIB5, SIB26, and/or NR V2X sidelink configuration information defined/introduced for NR V2X sidelink communication. The cell which the UE camps on may be referred to a serving cell (SCell) or a primary cell (PCell).

According to various embodiments of the disclosure, in operation 1025, the UE 1001 may be configured to perform LTE V2X sidelink communication and may select or reselect a suitable LTE cell and acquire system information including desired LTE V2X sidelink configuration information. The UE 1001 may perform LTE V2X sidelink communication on the basis of the acquired LTE V2X sidelink configuration information.

According to various embodiments of the disclosure, although the UE 1001 is configured to perform both the LTE V2X sidelink communication and the NR V2X sidelink communication, the UE 1001 may select or reselect a suitable LTE cell and acquire system information including only desired LTE V2X sidelink configuration information in operation 1025. The UE 1001 may perform LTE V2X sidelink communication on the basis of the acquired LTE V2X sidelink configuration information.

Specifically, in operation 1025, in case that the existence of SIBx described through a scheduling information list (SchedulingInfoList) in SIB1 (SystemInformationBlock-Type1) received from the cell (Scell or PCell) is indicated, the UE 1001 in the RRC inactive mode may acquire SIBx. Alternatively, in case that valid SIBx is not stored, the UE 1001 may acquire SIBx. In case that the LTE eNB 1003 broadcasts SIBx, SIBx selectively includes s1-V2X-Config-Common. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-psschTxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for a PC5 QoS profile. According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/logical channel (LCH) configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1030, higher-layer devices may configure the AS devices to receive NR V2X sidelink communication packet(s). Further, the higher-layer devices may indicate reception of NR V2X sidelink communication in a specific frequency.

According to various embodiments of the disclosure, operation 1030 may be performed in operation 1025.

In operation 1035, the higher-layer devices may configure PC5 QoS profile(s) (PQI according to an embodiment) to receive NR V2X sidelink communication packet(s) and transfer PC5 QoS profile(s) therefor to the AS device. In case that there is no indication indicating the performance of NR V2X sidelink communication in a specific frequency in operation 1030, the indication may be made in operation 1035.

In operation 1040, the AS devices may determine whether sidelink bearer configuration information for PC5 QoS profile(s) to be received through operation 1030 exists in SIBx received in operation 1025. According to an embodiment, the AS device may identify whether a sidelink bearer identifier mapped to the PC5 QoS profile(s) (for example, PQI and/or range) or a sidelink bearer therefor is configured. According to an embodiment, it is because the LTE eNB may not include sidelink bearer configuration information for PC5 QoS profile(s) due to restriction on the SIBx size. The sidelink bearer configuration information for PC5 QoS profile(s) may be broadcasted through SIBx regardless of a frequency or may be separately broadcasted for each frequency. In case that the sidelink bearer configuration information is broadcasted for each frequency, it may be determined whether the sidelink bearer configuration information for the PC5 QoS profile(s) in the frequency indicated by the above-described operation exists in the received SIBx.

In operation 1045, the AS devices may determine whether the specific frequency indicated by the higher-layer devices in operation 1030 or operation 1035 is in coverage or whether the specific frequency is included in SIBx.

In operation 1050, the AS devices may determine whether resource information for receiving NR V2X sidelink communication packet(s) is included in the specific frequency. Resource information according to this embodiment may refer to a generally used reception resource pool (for example, commRxPool).

In case that operation 1040, operation 1045, or operation 1050 is not satisfied, the UE may acquire system information broadcasted by the NR gNB 1004 in operation 1055. The system information may refer to system information including NR V2X sidelink communication configuration information that satisfies the above-described operation. The UE 1001 may perform a cell selection/reselection procedure and acquire the system information in case that there is no neighboring LTE cell that satisfies operation 1040, operation 1045, or operation 1050. An embodiment of the disclosure proposes a method by which the UE 1001 camps on the LTE cell, acquires only the system information from the NR cell, and uses information included in the system information without finally selecting/reselecting the NR cell. That is, since the UE 1001 does not finally perform inter-RAT cell selection/reselection, the RRC-inactive mode can be maintained in operation 1056. In addition, the UE 1001 may acquire only system information including NR V2X sidelink communication configuration information broadcasted by a second LTE cell rather than a first LTE cell which the UE 1001 currently camps on to perform NR sidelink communication without intra-RAT cell selection/reselection. For example, in case that there is the second LTE cell sharing the NR V2X sidelink communication configuration information and the LTE V2X sidelink communication configuration information in one frequency, the UE 1001 may acquire only the NR V2X sidelink communication configuration information from the second LTE cell operating in the corresponding frequency. The corresponding frequency may be a frequency indicated to perform NR V2X sidelink communication in operation 1030.

In operation 1060, the UE 1001 may receive NR V2X sidelink communication transmitted by another UE 1002 on the basis of the system information received in operation 1055. According to an embodiment, sidelink control information and/or data corresponding thereto may be monitored in a reception resource pool (commRxPool) indicated by the system information. In case that operation 1040, operation 1045, or operation 1050 is not satisfied, operation 1055 is not performed, and operation 1060 may be performed using the preconfiguration while the RRC-inactive mode is maintained in operation 1056. According to an embodiment, the UE 1001 may receive NR V2X sidelink communication transmitted by another UE 1002 through a reception resource pool (for example, preconfigComm in SL-Preconfiguration) included in the SL-V2X-preconfiguration. Alternatively, in case that operation 1040, operation 1045, or operation 1050 is not satisfied since the cell selection/reselection procedure is performed but a suitable LTE cell or NR cell has not been discovered, operation 1060 may be performed using the preconfiguration while the RRC inactive mode is maintained in operation 1056.

Figure 11:
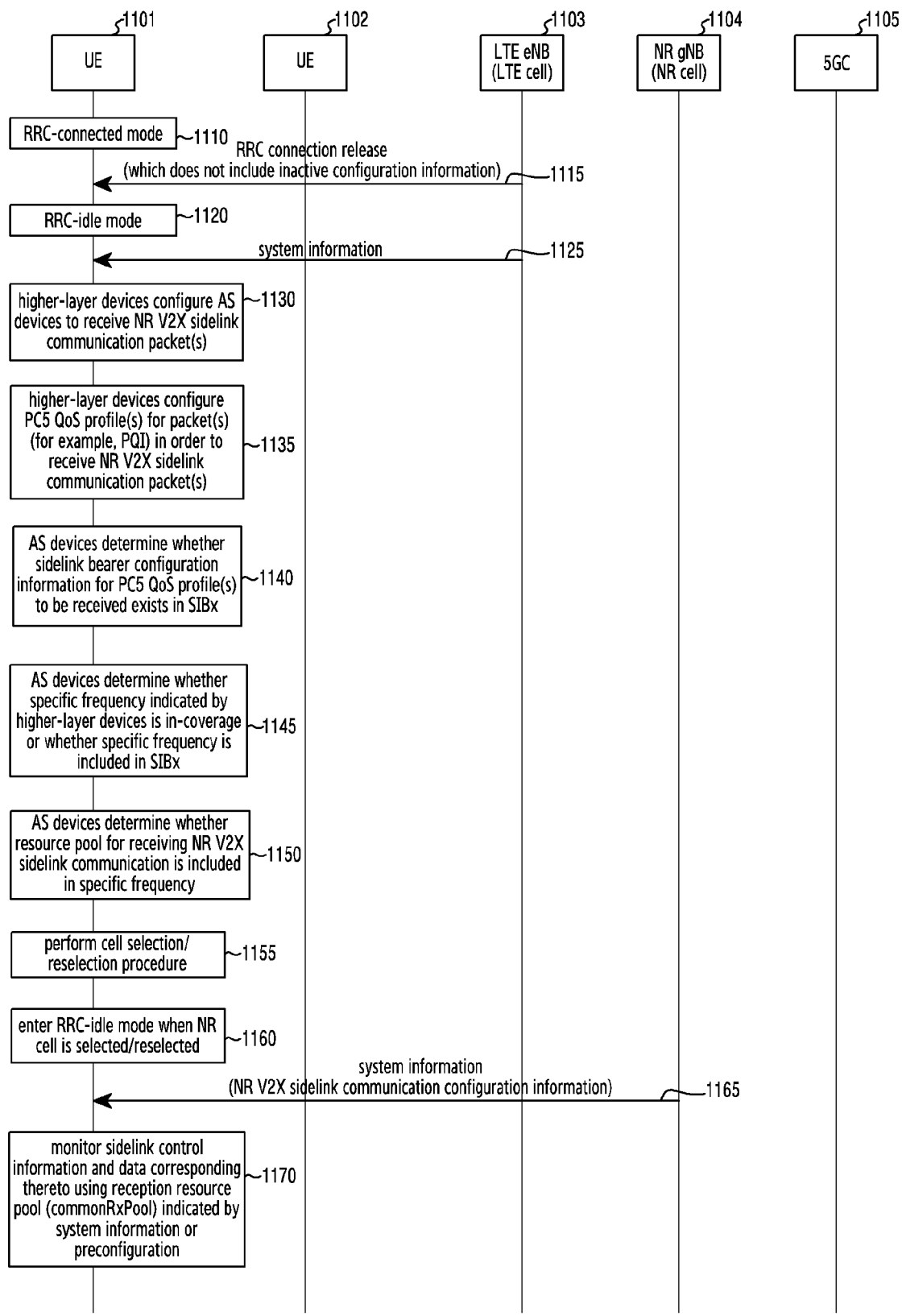
FIG. 11 illustrates an example of a procedure in which the UE switches from an RRC-connected mode (RRC_CONNECTED) to an RRC-idle mode (RRC_IDLE) with an LTE eNB (ng-eNB) connected to a 5GC and a procedure in which a UE in an RRC-idle mode performs NR V2X sidelink communication in a wireless communication system according to various embodiments of the disclosure.

FIG. 11 illustrates an example of a procedure in which the UE switches from an RRC-connected mode (RRC_CONNECTED) to an RRC-idle mode (RRC_IDLE) with an LTE eNB (ng-eNB) connected to a 5GC and a procedure in which a UE in an RRC-idle mode performs NR V2X sidelink communication in a wireless communication system according to various embodiments of the disclosure.

A UE 1101 according to an embodiment of the disclosure may refer to a vehicle UE or a pedestrian UE. The UE 1101 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The LTE eNB 1103 according to an embodiment of the disclosure may periodically broadcast system information related to LTE V2X sidelink configuration information and/or system information related to NR V2X sidelink configuration information.

Referring to FIG. 11, the UE 1101 may transmit and receive data to and from the LTE eNB 1103 connected to a 5GC in an RRC-connected mode (RRC_CONNECTED) in operation 1110.

In case that the UE 1101 has no transmission/reception of data for a predetermined reason or for a predetermined time, the LTE eNB 1103 may transmit an RRC connection release message (RRCConnectionRelease message) which does not include inactive configuration information (RRC-Inactive-Config) in operation 1115.

The UE 1101 receiving the RRC connection release message may switch to an RRC-idle mode (RRC_IDLE) in operation 1120.

The UE 1101 in the RRC-idle mode may discover a suitable LTE cell 1103 through a cell selection procedure or a cell reselection procedure and camp on the discovered cell to acquire system information in operation 1125. According to an embodiment, the system information may be one or a plurality of SIBx including MIB1, SIB1, SIB2, SIB3, SIB4, SIB5, SIB26, and/or NR V2X sidelink configuration information defined/introduced for NR V2X sidelink communication. The cell which the UE camps on may be referred to a serving cell (SCell) or a primary cell (PCell).

According to various embodiments of the disclosure, in operation 1125, the UE 1101 may be configured to perform LTE V2X sidelink communication and may select or reselect a suitable LTE cell and acquire desired system information including LTE V2X sidelink configuration information. The UE 1101 may perform LTE V2X sidelink communication on the basis of the acquired LTE V2X sidelink configuration information.

According to various embodiments of the disclosure, in operation 1125, the UE 1101 is configured to perform both the LTE V2X sidelink communication and the NR V2X sidelink communication, but may select or reselect a suitable LTE cell and acquire system information including only the desired LTE V2X sidelink configuration information. The UE 1101 may perform LTE V2X sidelink communication on the basis of the acquired LTE V2X sidelink configuration information.

Specifically, in operation 1125, in case that the existence of SIBx described through a scheduling information list (SchedulingInfoList) in SIB1 (SystemInformationBlock-Type1) received from the cell (Scell or PCell) is indicated, the UE 1101 in the RRC inactive mode may acquire SIBx. Alternatively, in case that valid SIBx is not stored, the UE 1101 may acquire SIBx. In case that the LTE eNB 1103 broadcasts SIBx, SIBx selectively includes s1-V2X-Config-Common. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for a PC5 QoS profile. According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/ logical channel (LCH) configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1130, higher-layer devices may configure the AS devices to receive NR V2X sidelink communication packet(s). Further, the higher-layer devices may indicate reception of NR V2X sidelink communication in a specific frequency.

According to various embodiments of the disclosure, operation 1130 may be performed in operation 1125.

In operation 1135, the higher-layer devices may configure PC5 QoS profile(s) (PQI according to an embodiment) to receive NR V2X sidelink communication packet(s) and transfer PC5 QoS profile(s) therefor to the AS device. In case that there is no indication indicating the reception of NR V2X sidelink communication in a specific frequency in operation 1130, the indication may be made in operation 1135.

In operation 1140, the AS devices may determine whether sidelink bearer configuration information for PC5 QoS profile(s) to be received through operation 1130 exists in SIBx received in operation 1125. According to an embodiment, the AS device may identify whether a sidelink bearer identifier mapped to the PC5 QoS profile(s) (for example, PQI and/or range) or a sidelink bearer therefor is configured. According to an embodiment, it is because the LTE eNB may not include sidelink bearer configuration information for PC5 QoS profile(s) due to restriction on the SIBx size. The sidelink bearer configuration information for PC5 QoS profile(s) may be broadcasted through SIBx regardless of a frequency or may be separately broadcasted for each frequency. In case that the sidelink bearer configuration information is broadcasted for each frequency, it may be determined whether the sidelink bearer configuration information for the PC5 QoS profile(s) in the frequency indicated by the above-described operation exists in the received SIBx.

In operation 1145, the AS devices may determine whether the specific frequency indicated by the higher-layer devices in operation 1130 or operation 1135 is in coverage or whether the specific frequency is included in SIBx.

In operation 1150, the AS devices may determine whether resource information for receiving NR V2X sidelink communication is included in the specific frequency. Resource information according to this embodiment may refer to a generally used reception resource pool (for example, commRxPool).

In case that operation 1140, operation 1145, or operation 1150 is not satisfied, the cell selection procedure or the cell reselection procedure may be performed in operation 1155. In case that a suitable NR cell 1104 is finally selected/reselected through the cell selection procedure or the cell reselection procedure, the UE 1101 may enter an RRC-idle mode in operation 1160.

In case that operation 1150 or operation 1145 is not satisfied, the UE 1101 may acquire only system information broadcasted by the NR cell 1104 without selection/reselection of the NR cell 1104 in operation 1155. The system information may refer to system information including NR V2X sidelink communication configuration information. The system information may be system information including NR sidelink communication configuration information that satisfies the above-described operation. An embodiment of the disclosure proposes a method by which the UE 1101 camps on the LTE cell 1104, acquires only the system information from the NR cell 1103, and uses information included in the system information without finally selecting/reselecting the NR cell 1104. That is, the UE 1101 may not finally perform inter-RAT cell selection/reselection.

In addition, the UE 1101 may acquire only system information including NR V2X sidelink communication configuration information broadcasted by a second LTE cell rather than a first LTE cell which the UE currently camps on to perform NR sidelink communication without intra-RAT cell selection/reselection. For example, in case that there is the second LTE cell sharing the NR V2X sidelink communication configuration information and the LTE V2X sidelink communication configuration information in one frequency, the UE 1101 may acquire only the NR V2X sidelink communication configuration information from the second LTE cell operating in the corresponding frequency. The corresponding frequency may be a frequency indicated to perform NR V2X sidelink communication in operation 1130.

In operation 1165, the UE 1101 may acquire system information broadcasted by the selected/reselected NR cell 1103. In case that the NR cell 1103 periodically performs broadcasting, the UE 1101 may acquire system information according to the corresponding period. In case that the NR cell 1103 signals system information in an on-demand type, the UE may make a request for the corresponding system information to the NR cell BS 1103 and acquire the same. According to an embodiment, the UE 1101 may transmit a request through a preamble (msg1) or through an RRC system information request message (RRCSystemInfoRequest message, msg3) in a random access procedure with the LTE eNB and acquire the system information. The system information may refer to system information including NR V2X sidelink communication configuration information that satisfies the above-described operation.

In operation 1170, the UE may receive NR V2X sidelink communication transmitted by another UE 1102 on the basis of the system information. According to an embodiment, sidelink control information and/or data corresponding thereto may be monitored in a reception resource pool (commRxPool) indicated by the system information. Alternatively, in case that operation 1140, operation 1145, or operation 1150 is not satisfied since the cell selection/reselection is performed but a suitable LTE cell or NR cell has not been discovered, operation 1170 may be performed using a preconfiguration. According to an embodiment, the UE 1101 may receive NR V2X sidelink communication transmitted by another UE 1102 through a reception resource pool (for example, preconfigComm in SL-Preconfiguration) included in the SL-V2X-preconfiguration. Alternatively, in case that operation 1140, operation 1145, or operation 1150 is not satisfied, operation 1170 may be performed using the preconfiguration without operation 1155.

Figure 12:
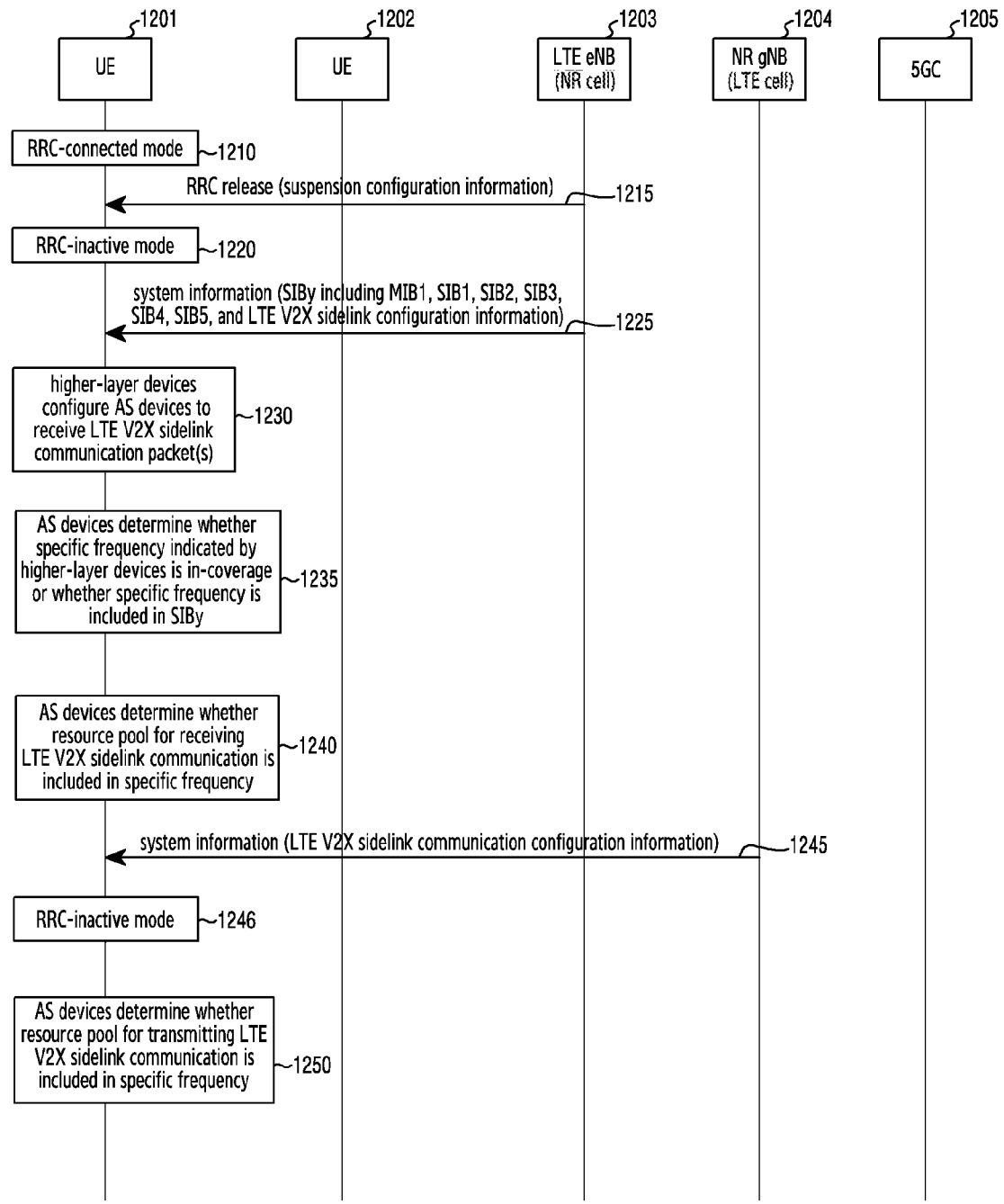
FIG. 12 illustrates an example of a procedure in which the UE switches from an RRC-connected mode (RRC_CONNECTED) to an RRC-inactive mode (RRC_IDLE) with an NR gNB connected to a 5GC and a procedure in which a UE in an RRC-inactive mode performs LTE V2X sidelink communication in a wireless communication system according to various embodiments of the disclosure.

FIG. 12 illustrates an example of a procedure in which the UE switches from an RRC-connected mode (RRC_CONNECTED) to an RRC-inactive mode (RRC_IDLE) with an NR gNB connected to a 5GC and a procedure in which a UE in an RRC-inactive mode performs LTE V2X sidelink communication in a wireless communication system according to various embodiments of the disclosure.

A UE 1201 according to an embodiment of the disclosure may refer to a vehicle UE or a pedestrian UE. The UE 1201 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The NR gNB according to an embodiment of the disclosure may broadcast system information related to LTE V2X sidelink configuration information and/or system information related to NR V2X sidelink configuration information periodically or in an on-demand type.

Referring to FIG. 12, the UE 1201 may transmit and receive data to and from the NR gNB 1203 connected to a 5GC in an RRC-connected mode (RRC_CONNECTED) in operation 1210.

In case that the UE 1201 has no transmission/reception of data for a predetermined reason or for a predetermined time, the NR gNB 1201 may transmit an RRC connection release message (RRCConnectionRelease message) including suspension configuration information (suspendConfig) in operation 1215.

The UE 1201 receiving the RRC connection release message may switch to an RRC-inactive mode (RRC_INACTIVE) in operation 1220.

The UE 1201 in the RRC-inactive mode may discover a suitable NR cell 1203 through a cell selection procedure or a cell reselection procedure and camp on the discovered cell to acquire system information in operation 1225. According to an embodiment, the system information may be one or a plurality of SIBy including MIB1, SIB1, SIB2, SIB3, SIB4, SIB5, and LTE V2X sidelink configuration information defined/introduced for LTE V2X sidelink communication. The cell which the UE camps on may be referred to a serving cell (SCell) or a primary cell (PCell).

According to various embodiments of the disclosure, the UE 1201 may be configured to perform NR V2X sidelink communication and may select or reselect a suitable NR cell and acquire system information including desired NR V2X sidelink configuration information in operation 1225. The UE 1201 may perform NR V2X sidelink communication on the basis of the acquired NR V2X sidelink configuration information.

According to various embodiments of the disclosure, in operation 1225, the UE 1201 is configured to perform both LTE V2X sidelink communication and NR V2X sidelink communication, the UE 1201 may select or reselect a suitable NR cell and acquire system information including only desired NR V2X sidelink configuration information. The UE 1201 may perform NR V2X sidelink communication on the basis of the acquired NR V2X sidelink configuration information.

Specifically, in operation 1225, in case that the existence of SIBy described through a system information scheduling information list (si-SchedulingInfo) in SIB1 (SystemInformationBlockType1) received from the cell (Scell or PCell) is indicated, the UE 1201 in the RRC-inactive mode may acquire SIBy. Alternatively, valid SIBy is not stored, the UE 1201 may acquire SIBy. In case that the NR gNB 1203 broadcasts SIBy, SIBy selectively includes s1-V2X-Config-Common. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-psschTxConfigList, v2x-packetDuplicationConfig, syncFreqList, slss-TxMultiFreq, v2x-FreqSelectionConfigList, and threshS-RSSI-CBR.

In operation 1230, higher-layer devices may configure the AS devices to receive LTE V2X sidelink communication. Further, an indication indicating reception of LTE V2X sidelink communication in a specific frequency may be made.

According to various embodiments of the disclosure, operation 1230 may be performed in operation 1225.

In operation 1235, the AS devices may determine whether the specific frequency indicated by the higher-layer devices in operation 1230 is in coverage or whether the specific frequency is included in SIBy.

In operation 1240, the AS devices may determine whether resource information for receiving LTE V2X sidelink communication is included in the specific frequency. Resource information according to this embodiment may refer to a generally used reception resource pool (for example, commRxPool).

In case that operation 1235 or operation 1240 is not satisfied, the UE may acquire system information broadcasted by the LTE eNB 1204 in operation 1245. The system information may refer to system information including LTE sidelink communication configuration information that satisfies the above-described operation. According to an embodiment, the system information may be SIB21 or SIB26. In case that there is no neighboring NR cell that satisfies operation 1235 or operation 1240 on the basis of the cell selection/reselection procedure, the UE 1201 may acquire the system information. An embodiment of the disclosure proposes a method by which the UE camps on the NR cell, acquires only the system information from the LTE cell, and uses information included in the system information without finally selecting/reselecting the LTE cell. That is, since the UE 1201 does not finally perform inter-RAT cell selection/reselection, the RRC-inactive mode can be maintained in operation 1246.

In addition, the UE 1201 may acquire only system information including LTE V2X sidelink communication configuration information broadcasted by a second NR cell rather than a first NR cell which the UE currently camps on to perform LTE sidelink communication without intra-RAT cell selection/reselection. For example, in case that there is the second NR cell sharing the NR V2X sidelink communication configuration information and the LTE V2X sidelink communication configuration information in one frequency, the UE 1201 may acquire only the LTE V2X sidelink communication configuration information from the second NR cell operating in the corresponding frequency. The corresponding frequency may be a frequency indicated to perform LTE V2X sidelink communication in operation 1230.

In operation 1250, the UE 1201 may receive LTE V2X sidelink communication transmitted by another UE 1202 on the basis of the system information received in operation 1245. According to an embodiment, sidelink control information and/or data corresponding thereto may be monitored in a reception resource pool (commRxPool) indicated by the system information. Alternatively, in case that operation 1235 or operation 1240 is not satisfied, operation 1245 is not performed and operation 1250 may be performed using the preconfiguration while the RRC-inactive mode is maintained in operation 1246. According to an embodiment, the UE 1201 may receive LTE V2X sidelink communication transmitted by another UE 1202 through a reception resource pool (for example, preconfigComm in SL-Preconfiguration) included in the SL-V2X-preconfiguration. Alternatively, in case that operation 1235 or operation 1240 is not satisfied since the cell selection/reselection procedure is performed but a suitable LTE cell or NR cell has not been discovered, operation 1250 may be performed using the preconfiguration while the RRC inactive mode is maintained in operation 1246.

Figure 13:
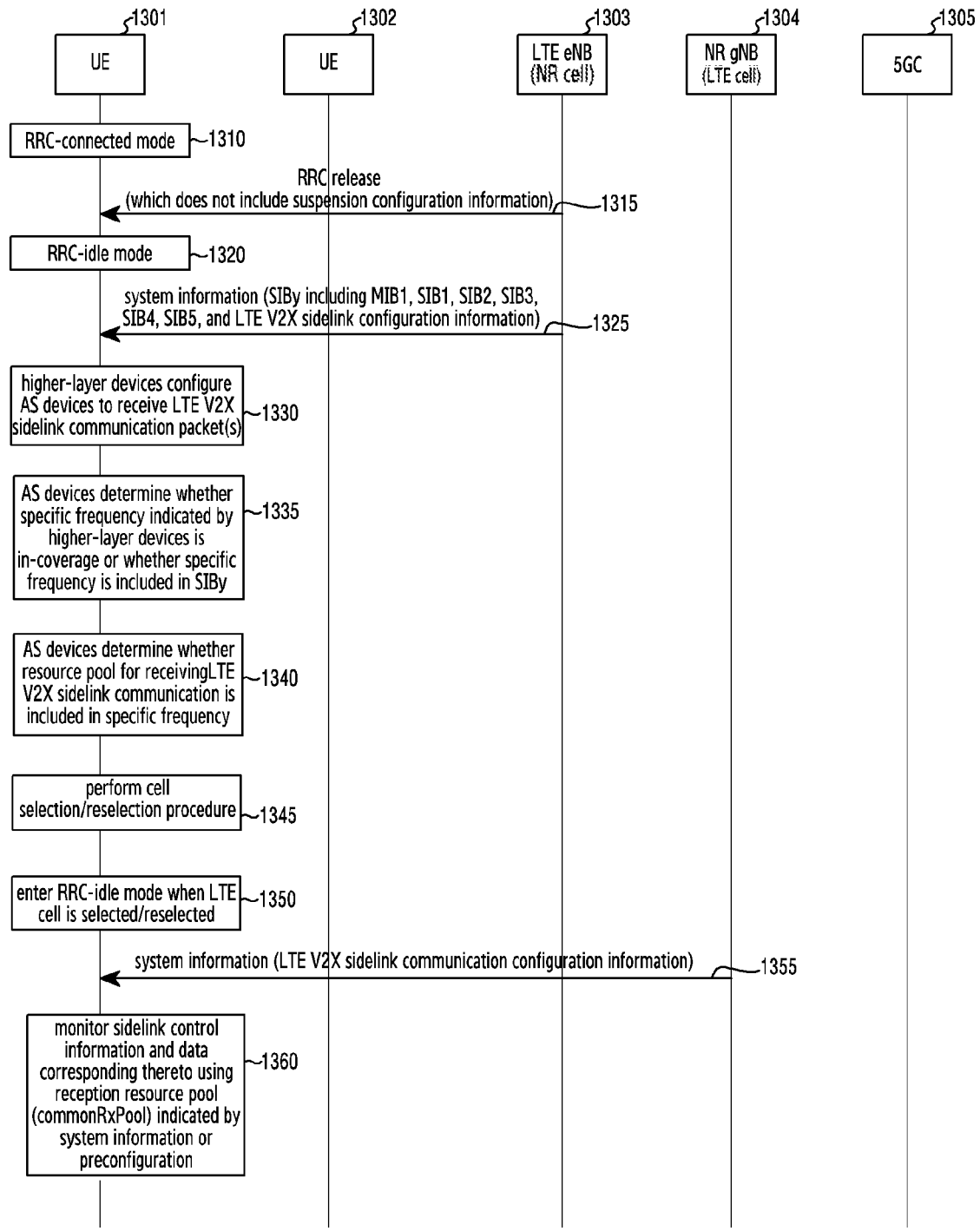
FIG. 13 illustrates an example of a procedure in which the UE switches from an RRC-connected mode (RRC_CONNECTED) to an RRC-idle mode (RRC_IDLE) with an NR gNB connected to a 5GC and a procedure in which a UE in an RRC-idle mode performs LTE V2X sidelink communication in a wireless communication system according to various embodiments of the disclosure.

FIG. 13 illustrates an example of a procedure in which the UE switches from an RRC-connected mode (RRC_CONNECTED) to an RRC-idle mode (RRC_IDLE) with an NR gNB connected to a 5GC and a procedure in which a UE in an RRC-idle mode performs LTE V2X sidelink communication in a wireless communication system according to various embodiments of the disclosure.

A UE 1302 according to an embodiment of the disclosure may refer to a vehicle UE or a pedestrian UE. The UE 1302 may support V2X sidelink communication through one or a plurality of radio access technologies (RATs). According to an embodiment, the UE may support only LTE V2X sidelink communication or only NR V2X sidelink communication, or may support both the LTE V2X sidelink communication and the NR V2X sidelink communication. The NR gNB according to an embodiment of the disclosure may broadcast system information related to LTE V2X sidelink configuration information and/or system information related to NR V2X sidelink configuration information periodically or in an on-demand type.

Referring to FIG. 13, the UE 1301 may transmit and receive data to and from the NR gNB 1303 connected to a 5GC in an RRC-connected mode (RRC_CONNECTED) in operation 1310.

In case that there is no transmission/reception of data for a predetermined reason or for a predetermined time, the UE 1302 may transmit an RRC release message (RRCRelease message) which does not include suspension configuration information (suspendConfig) in operation 1315.

The UE 1302 receiving the RRC connection release message may switch to an RRC-idle mode (RRC_IDLE) in operation 1320.

The UE 1302 in the RRC-idle mode may discover a suitable NR cell 1302 through a cell selection procedure or a cell reselection procedure and camp on the discovered cell to acquire system information in operation 1325. According to an embodiment, the system information may be one or a plurality of SIBy including MIB1, SIB1, SIB2, SIB3, SIB4, SIB5, and LTE V2X sidelink configuration information defined/introduced for LTE V2X sidelink communication. The cell which the UE camps on may be referred to a serving cell (SCell) or a primary cell (PCell).

Specifically, in operation 1325, in case that the existence of SIBy described through a system information scheduling information list (si-SchedulingInfo) in SIB1 (SystemInformationBlockType1) received from the cell (Scell or PCell) is indicated, the UE 1302 in the RRC-inactive mode may acquire SIBy. Alternatively, valid SIBy is not stored, the UE 1302 may acquire SIBy. In case that the NR gNB 1303 broadcasts SIBy, SIBy selectively includes s1-V2X-Config-Common. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-psschTxConfigList, v2x-packetDuplicationConfig, syncFreqList, slss-TxMultiFreq, v2x-FreqSelectionConfigList, and threshS-RSSI-CBR.

In operation 1330, higher-layer devices may configure the AS devices to receive LTE V2X sidelink communication. Further, the higher-layer devices may indicate reception of LTE V2X sidelink communication in a specific frequency to the AS devices.

According to various embodiments of the disclosure, in operation 1335, the higher-layer devices may configure the AS devices to receive NR V2X sidelink communication. The higher-layer devices may indicate performance of NR V2X sidelink communication in a specific frequency to the AS devices.

According to various embodiments of the disclosure, in case that NR V2X sidelink configuration information which the UE 1301 desires in the RRC-idle mode exists in the system information acquired in operation 1325, the UE 1301 may perform NR V2X sidelink communication on the basis of the NR V2X sidelink configuration information.

In operation 1335, the AS devices may determine whether the specific frequency indicated by the higher-layer devices in operation 1330 is in coverage or whether the specific frequency is included in SIBy.

In operation 1340, the AS devices may determine whether resource information for receiving LTE V2X sidelink communication is included in the specific frequency. Resource information according to this embodiment may refer to a generally used reception resource pool (for example, commRxPool).

In case that operation 1335 or operation 1340 is not satisfied, the cell selection procedure or the cell reselection procedure may be performed in operation 1345. In case that a suitable LTE cell 1304 is finally selected/reselected through the cell selection procedure or the cell reselection procedure, the UE 1302 may enter an RRC-idle mode in operation 1350.

In operation 1355, the UE 1302 may acquire system information broadcasted by the selected/reselected LTE eNB 1304. The system information may refer to system information including LTE V2X sidelink communication configuration information that satisfies the above-described operation.

In operation 1360, the UE 1301 may receive LTE V2X sidelink communication packet(s) transmitted by another UE 1302 on the basis of the system information received in operation 1355. According to an embodiment, sidelink control information and/or data corresponding thereto may be monitored in a reception resource pool (commRxPool) indicated by the system information. Alternatively, in case that operation 1335 or operation 1340 is not satisfied since the cell selection/reselection is performed but a suitable LTE cell or NR cell has not been discovered, operation 1360 may be performed using a preconfiguration. According to an embodiment, the UE 1301 may receive NR V2X sidelink communication transmitted by another UE 1302 through a reception resource pool (for example, preconfigComm in SL-Preconfiguration) included in the SL-V2X-preconfiguration. Alternatively, in case that operation 1340 is not satisfied since the cell selection/reselection is performed but a suitable LTE cell or NR cell has not been discovered, operation 1360 may be performed using a preconfiguration.

Hereinafter, FIGS. 14 to 17 illustrate various embodiments for managing a sidelink bearer to support V2X communication in a next-generation mobile communication system.

Figure 14:
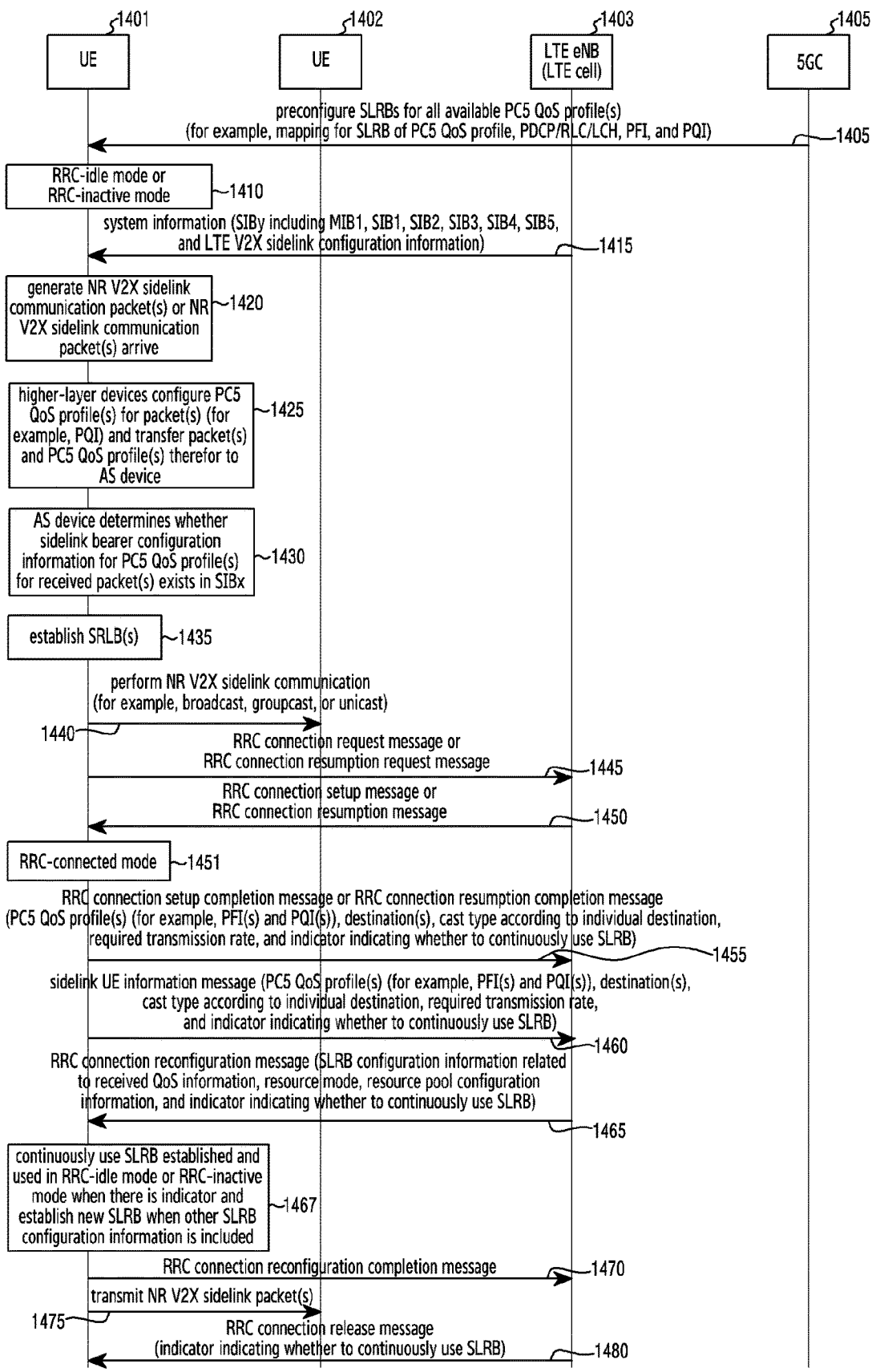
FIG. 14 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an LTE eNB during NR V2X sidelink communication, managing the established SLRB in a wireless communication system according to various embodiments of the disclosure.

FIG. 14 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an LTE eNB during NR V2X sidelink communication, managing the established SLRB in a wireless communication system according to various embodiments of the disclosure.

A UE 1401 according to an embodiment of the disclosure may refer to a vehicle UE or a pedestrian UE. The UE 1401 may support LTE V2X sidelink communication and/or NR V2X sidelink communication. The LTE eNB 1403 according to an embodiment of the disclosure may periodically broadcast or signal system information related to LTE V2X sidelink configuration information or system information related to NR V2X sidelink configuration information.

Referring to FIG. 14, the UE 1401 capable of performing NR V2X sidelink communication may preconfigure SLRB configuration information for PC5 QoS profile(s) from a core network in operation 1405. At this time, SLRB configuration information may be preconfigured for all available PC5 QoS profile(s). According to an embodiment, the preconfigured SLRB configuration information may include, for example, mapping for the SLRB of the PC5 QoS profile, PDCP/RLC/LCH, PFI, PQI, and the like.

The UE 1401 does not establish the RRC connection with the LTE eNB 1403 and thus may be in the RRC-idle mode (RRC_IDLE) or the RRC-inactive mode (RRC_INACTIVE) in operation 1410.

The UE 1401 in the RRC-idle mode or the RRC-inactive mode may discover a suitable LTE cell 1403 through a cell selection procedure or a cell reselection procedure and camp on the discovered cell to acquire system information in operation 1415. According to an embodiment, the system information may be one or a plurality of SIBx including MIB1, SIB1, SIB2, SIB3, SIB4, SIB5, SIB21, SIB26, and/or NR V2X sidelink configuration information defined/introduced for NR V2X sidelink communication. The cell which the UE camps on may be referred to a serving cell (SCell) or a primary cell (PCell).

Specifically, in operation 1415, in case that the existence of SIBx described through a scheduling information list (SchedulingInfoList) in SIB1 (SystemInformationBlockType1) received from the cell (Scell or PCell) is indicated, the UE 1401 in the RRC-idle mode or the RRC-inactive mode may acquire SIBx. Alternatively, in case that valid SIBx is not stored, the UE 1401 may acquire SIBx. In case that the LTE eNB 1403 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-Common-TxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/logical channel (LCH) configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1420, packet(s) for transmitting NR V2X sidelink communication may be generated or arrive and configured to perform NR V2X sidelink communication. Further, an indication indicating the performance thereof in a specific frequency may be made.

In operation 1425, the higher-layer devices may configure PC5 QoS profile(s) (PQI according to an embodiment) and transfer packet(s) and PC5 QoS profile(s) therefor to the AS device.

In operation 1430, the AS devices may determine whether sidelink bearer configuration information for PC5 QoS profile(s) for the packets received in operation 1425 exists in SIBx received in operation 1415.

In case that the sidelink bearer configuration information for the PC5 QoS profile(s) for the packets received in operation 1425 exists in SIBx received in operation 1415, the AS device may establish the SLRB(s) in operation 1435. In case that the information in not included in SIBx, the AS device may establish the SLRB(s) on the basis of the information preconfigured in operation 1405.

In operation 1440, the UE 1401 may perform NR V2X sidelink communication with another UE 1402 through the SLRB(s) established in operation 1435. The NR V2X sidelink communication may be performed through broadcast, groupcast, or unicast.

In operation 1145, the UE 1401 in the RRC-idle mode may transmit an RRC connection request message (RRCConnectionRequest message) to the LTE eNB in order to perform an RRC connection establishment procedure with the LTE eNB 1403. In operation 1450, the LTE eNB may transmit an RRC connection setup message (RRCConnectionSetup message) to the UE in the RRC-idle mode. The UE 1401 receiving the RRC connection setup message may apply configuration information included in the message and then transition to the RRC-connected mode in operation 1451. The UE 1401 may continuously perform NR V2X sidelink communication with another UE 1402 on the basis of the system information acquired in operation 1415 through the SLRB(s) established in operation 1435. The UE 1401 may transmit an RRC connection setup completion message (RRCConnectionSetupComplete message) to the LTE eNB in operation 1455. The RRC connection setup completion message may include QoS information related to the SLRB(s) established and used in the RRC-idle mode. According to an embodiment, the RRC connection setup completion message may include at least one piece of the following information related to the SLRB(s) established and used in the RRC-idle mode.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1445, the UE 1401 in the RRC-inactive mode may transmit an RRC connection resumption request message (RRCConnectionResumeRequest message) to the LTE eNB in order to perform an RRC connection resumption procedure with the LTE eNB 1403. In operation 1450, the LTE eNB may transmit an RRC connection resumption message (RRCConnectionResume message) to the UE in the RRC-inactive mode. The UE 1401 receiving the RRC connection resumption message may apply configuration information included in the message and then transition to the RRC-connected mode in operation 1451. The UE 1401 may continuously perform NR V2X sidelink communication with another UE 1402 on the basis of the system information acquired in operation 1415 through the SLRB(s) established in operation 1435. The UE 1401 may transmit an RRC connection resumption completion message (RRCConnectionResumeComplete message) to the LTE eNB in operation 1455. The RRC connection resumption completion message may include QoS information related to the SLRB(s) established and used in the RRC-inactive mode. According to an embodiment, at least one piece of the following information related to the SLRB(s) established and used in the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1460, the UE 1401 in the RRC-connected mode may transmit a sidelink UE information message (SidelinkUEInformation message) to the LTE eNB. In case that the QoS information is not included in the RRC connection setup completion message or the RRC connection resumption completion message in operation 1455, operation 1460 may be performed. The sidelink UE information message may include QoS information related to the SLRB(s) established and used in the RRC-idle mode or the RRC-inactive mode. According to an embodiment, at least one piece of the following information related to the SLRB(s) established and used in the RRC-idle mode or the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1465, the LTE eNB may insert at least one of piece of the following information into an RRC connection reconfiguration message and transmit the RRC connection reconfiguration message to the UE in the RRC-connected mode.

SLRB configuration information related to QoS information included in operation 1455 or operation 1460

An indicator (indication) indicating whether to continuously use SLRB configuration information established and used in the RRC-idle mode or the RRC-inactive mode Resource mode (mode 3 or mode 4)

Resource pool configuration information according to resource mode

In operation 1467, the UE 1401 may determine whether to continuously use the SLRB established and used in the RRC-idle mode or the RRC-inactive mode on the basis of the message received in operation 1465. According to an embodiment, in case that an indicator indicating the continuous use is inserted into the RRC connection reconfiguration (RRCConnectionReconfiguration) message or in case that information which is the same as the SLRB established and used in the RRC-idle mode or the RRC-inactive mode is included, the UE 1401 in the RRC-connected mode may perform NR V2X communication with another UE 1402 by continuously using the conventionally used SLRB. In case that SLRB configuration information which was not established in the RRC-idle mode or the RRC-inactive mode is included, the UE 1401 in the RRC-connected mode may newly establish SLRB(s) and perform NR V2X communication with another UE 1402. In case that the UE 1401 newly establishes SLRB(s) and performs unicast communication with another UE 1402, the UE 1401 may transmit a PC5 RRC message including new SLRB configuration information to another UE 1402.

The UE 1401 may transmit an RRC connection reconfiguration completion (RRCConnectionReconfigurationComplete) message to the LTE eNB in operation 1470 and perform NR V2X sidelink communication (transmit NR V2X sidelink packet(s)) with another UE 1402 in operation 1475.

In case that the UE transmitting and receiving data in the RRC-connected mode has no data transmission/reception for a predetermined reason or for a predetermined time, the LTE eNB may switch the UE to the RRC-idle mode (RRC_IDEL) or the RRC-inactive mode (RRC_INACTIVE) by transmitting an RRC connection release message (RRCConnectionRelease message) in operation 1480. The message may include an indicator or an information element indicating whether to continuously use or release the SLRB used in the RRC-connected mode. The UE 1401 in the RRC-idle mode or the RRC-inactive mode may perform NR V2X sidelink communication with another UE 1402 by determining whether to continuously use or release the SLRB used with another UE 1402 on the basis of information included in the RRC connection release message or whether to newly establish SLRB(s) on the basis of system information. In case that the UE 1401 is required to change or release the SLRB conventionally used with another UE 1402 or to newly establish SLRB(s), if the UE is performing unicast communication with another UE 1402, the UE 1401 may transmit a PC5 RRC message including new SLRB configuration information to another UE 1402.

In operation 1451, the UE 1401 may transition from the RRC-idle mode or the RRC-inactive mode to the RRC-connected mode and then release all SLRBs established and used in the RRC-idle mode or the RRC-inactive mode.

Figure 15:
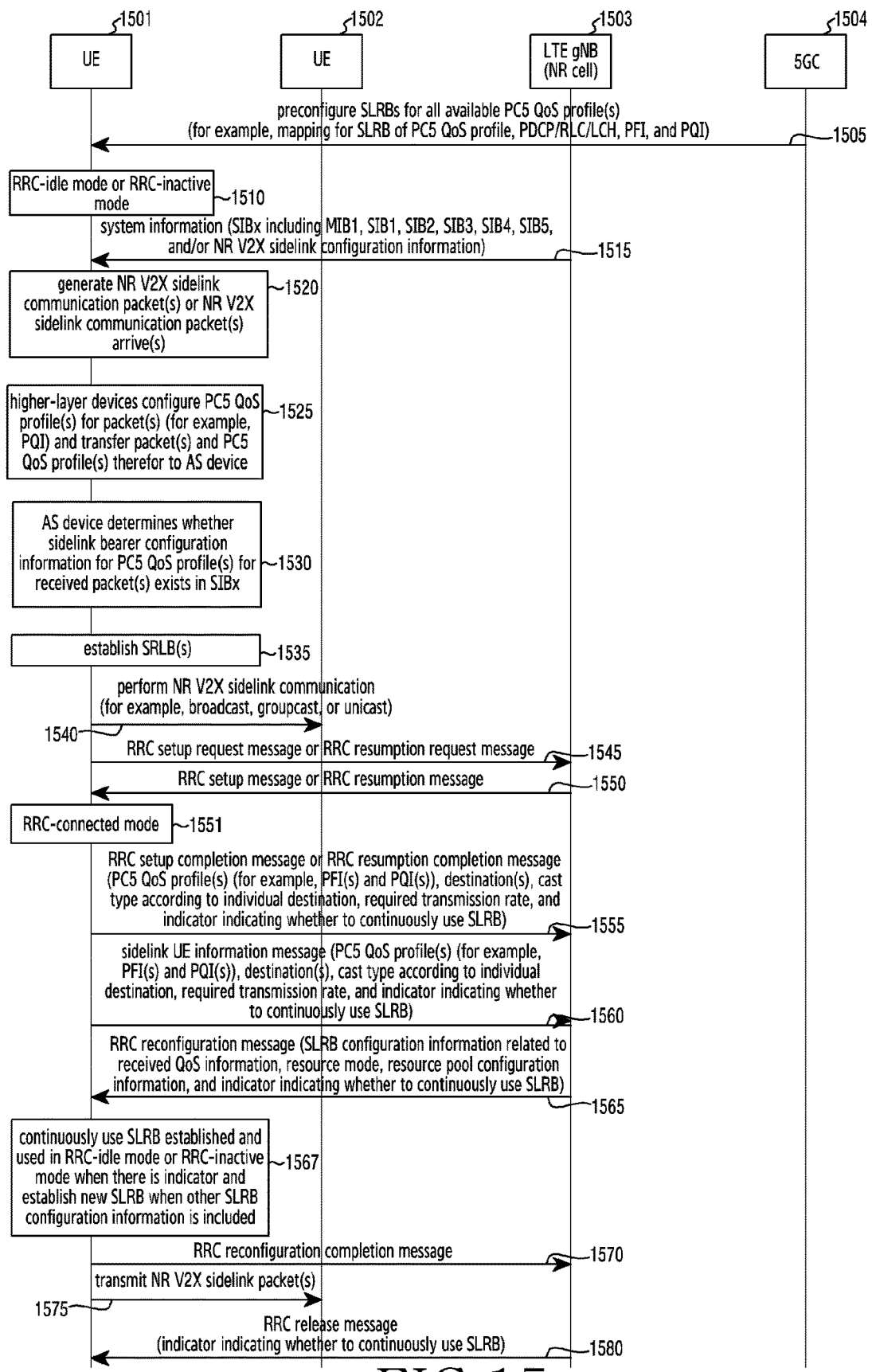
FIG. 15 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an NR gNB during NR V2X sidelink communication, managing the established SLRB in a wireless communication system according to various embodiments of the disclosure.

FIG. 15 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an NR gNB during NR V2X sidelink communication, managing the established SLRB in a wireless communication system according to various embodiments of the disclosure.

A UE 1501 according to an embodiment of the disclosure may refer to a vehicle UE or a pedestrian UE. The UE 1501 may support LTE V2X sidelink communication and/or NR V2X sidelink communication. The NR gNB according to an embodiment of the disclosure may signal system information related to LTE V2X sidelink configuration information or system information related to NR V2X sidelink configuration information periodically or in an on-demand type.

Referring to FIG. 15, the UE 1501 capable of performing NR V2X sidelink communication may preconfigure SLRB configuration information for PC5 QoS profile(s) from a core network in operation 1505. At this time, SLRB configuration information may be preconfigured for all available PC5 QoS profile(s). According to an embodiment, the preconfigured SLRB configuration information may include, for example, mapping for the SLRB of the PC5 QoS profile, PDCP/RLC/LCH, PFI, PQI, and the like.

The UE 1501 does not establish the RRC connection with the LTE eNB 1503 and thus may be in the RRC-idle mode (RRC_IDLE) or the RRC-inactive mode (RRC_INACTIVE) in operation 1510.

The UE 1501 in the RRC-idle mode or the RRC-inactive mode may discover a suitable NR cell 1503 through a cell selection procedure or a cell reselection procedure and camp on the discovered cell to acquire system information in operation 1515. According to an embodiment, the system information may be one or a plurality of SIM including MIB1, SIB1, SIB2, SIB3, SIB4, SIB5, and/or NR V2X sidelink configuration information defined/introduced for NR V2X sidelink communication. The cell which the UE camps on may be referred to a serving cell (SCell) or a primary cell (PCell).

Specifically, in operation 1515, in case that the existence of SIBx described through a scheduling information list (SchedulingInfoList) in SIB1 (SystemInformationBlock-Type1) received from the cell (Scell or PCell) is indicated, the UE 1501 in the RRC-idle mode or the RRC-inactive mode may acquire SIBx. Alternatively, in case that valid SIBx is not stored, the UE 1501 may acquire SIBx. In case that the NR gNB 1503 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/LCH configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1520, packet(s) for transmitting NR V2X sidelink communication may be generated or arrive and configured to perform NR V2X sidelink communication. Further, an indication indicating the performance thereof in a specific frequency may be made.

In operation 1525, the higher-layer devices may configure PC5 QoS profile(s) (PQI according to an embodiment) and transfer packet(s) and PC5 QoS profile(s) therefor to the AS device.

In operation 1530, the AS device may determine whether sidelink bearer configuration information for PC5 QoS profile(s) for the packets received in operation 1525 exists in SIBx received in operation 1515.

In operation 1535, in case that the sidelink bearer configuration information for the PC5 QoS profile(s) for the packets received in operation 1525 exists in SIBx received in operation 1515, the AS device may establish the SLRB(s) in operation 1515. In case that the information is not included in SIBx, the SLRB(s) may be established on the basis of the information preconfigured in operation 1505.

In operation 1540, the UE 1501 may perform NR V2X sidelink communication with another UE 1502 through the SLRB(s) established in operation 1535. The NR V2X sidelink communication may be performed through broadcast, groupcast, or unicast.

In operation 1545, the UE 1501 in the RRC-idle mode may transmit an RRC setup request message (RRCSetupRequest message) to the NR gNB in order to perform an RRC connection establishment procedure with the NR gNB 1503. In operation 1550, the NR gNB may transmit an RRC setup message (RRCSetup message) to the UE in the RRC-idle mode. The UE 1501 receiving the RRC setup message may apply configuration information included in the message and then transition to the RRC-connected mode in operation 1551. The UE 1501 may continuously perform NR V2X sidelink communication with another UE 1515 on the basis of the system information acquired in operation 1515 through the SLRB(s) established in operation 1535. The UE 1501 may transmit an RRC setup completion message (RRCSetupComplete message) to the NR gNB in operation 1555. The RRC setup completion message may include QoS information related to the SLRB(s) established and used in the RRC-idle mode. According to an embodiment, the RRC connection setup completion message may include at least one piece of the following information related to the SLRB(s) established and used in the RRC-idle mode.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1545, the UE 1501 in the RRC-inactive mode may transmit an RRC resumption request message (RRCResumeRequest message) to the NR gNB in order to perform an RRC connection resumption procedure with the NR gNB 1503. In operation 1550, the NR gNB may transmit an RRC resumption message (RRCResume message) to the UE in the RRC-inactive mode. The UE 1501 receiving the RRC resumption message may apply configuration information included in the message and then transition to the RRC-connected mode in operation 1551. The UE 1501 may continuously perform NR V2X sidelink communication with another UE 1515 on the basis of the system information acquired in operation 1502 through the SLRB(s) established in operation 1535. The UE 1501 may transmit an RRC resumption completion message (RRCResumeComplete message) to the NR gNB in operation 1555. The RRC resumption completion message may include QoS information related to the SLRB(s) established and used in the RRC-inactive mode. According to an embodiment, at least one piece of the following information related to the SLRB(s) established and used in the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode Mapping information for PC5 QoS flow (for example, PFI to SLRB mapping and QoS profile to SLRB mapping)

In operation 1560, the UE 1501 in the RRC-connected mode may transmit a sidelink UE information message (SidelinkUEInformation message) to the NR gNB. In case that the QoS information is not included in the RRC setup completion message or the RRC resumption completion message in operation 1555, operation 1560 may be performed. The sidelink UE information message may include QoS information related to the SLRB(s) established and used in the RRC-idle mode or the RRC-inactive mode. According to an embodiment, at least one piece of the following information related to the SLRB(s) established and used in the RRC-idle mode or the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1565, the NR gNB may insert at least one of piece of the following information into an RRC reconfiguration (RRCReconfiguration) message and transmit the RRC reconfiguration message to the UE in the RRC-connected mode.

SLRB configuration information related to QoS information included in operation 1555 or operation 1560

An indicator (indication) indicating whether to continuously use SLRB configuration information established and used in the RRC-idle mode or the RRC-inactive mode Resource mode (mode 1 or mode 2)

Resource pool configuration information according to resource mode

In operation 1567, the UE 1501 may determine whether to continuously use the SLRB established and used in the RRC-idle mode or the RRC-inactive mode on the basis of the message received in operation 1565. According to an embodiment, in case that an indicator indicating the continuous use is inserted into the RRC reconfiguration (RRCReconfiguration) message or in case that information which is the same as the SLRB established and used in the RRC-idle mode or the RRC-inactive mode is included, the UE 1501 in the RRC-connected mode may perform NR V2X communication with another UE 1502 by continuously using the conventionally used SLRB. In case that SLRB configuration information which was not established in the RRC-idle mode or the RRC-inactive mode is included, the UE 1501 in the RRC-connected mode may newly establish SLRB(s) and perform NR V2X communication with another UE 1502. In case that the UE 1501 newly establishes SLRB(s) and performs unicast communication with another UE 1502, the UE 1501 may transmit a PC5 RRC message including new SLRB configuration information to another UE 1502.

The UE 1501 may transmit an RRC reconfiguration completion (RRCReconfigurationComplete) message to the NR gNB in operation 1570 and perform NR V2X sidelink communication (transmit NR V2X sidelink packet(s)) with another UE 1502 in operation 1575.

In case that the UE transmitting and receiving data in the RRC-connected mode has no data transmission/reception for a predetermined reason or for a predetermined time, the NR gNB may switch the UE to the RRC-idle mode (RRC_IDEL) or the RRC-inactive mode (RRC_INACTIVE) by transmitting an RRC release message (RRCRelease message) in operation 1580. The message may include an indicator or an information element indicating whether to continuously use or release the SLRB used in the RRC-connected mode. The UE 1501 in the RRC-idle mode or the RRC-inactive mode may perform NR V2X sidelink communication with another UE 1502 by determining whether to continuously use or release the SLRB used with another UE 1502 on the basis of information included in the RRC connection release message or whether to newly establish SLRB(s) on the basis of system information. In case that the UE 1501 is required to change or release the SLRB conventionally used with another UE 1502 or to newly establish SLRB(s), if the UE is performing unicast communication with another UE 1502, the UE 1501 may transmit a PC5 RRC message including new SLRB configuration information to another UE 1502.

In operation 1551, the UE 1501 may transition from the RRC-idle mode or the RRC-inactive mode to the RRC-connected mode and then release all SLRBs established and used in the RRC-idle mode or the RRC-inactive mode.

Figure 16:
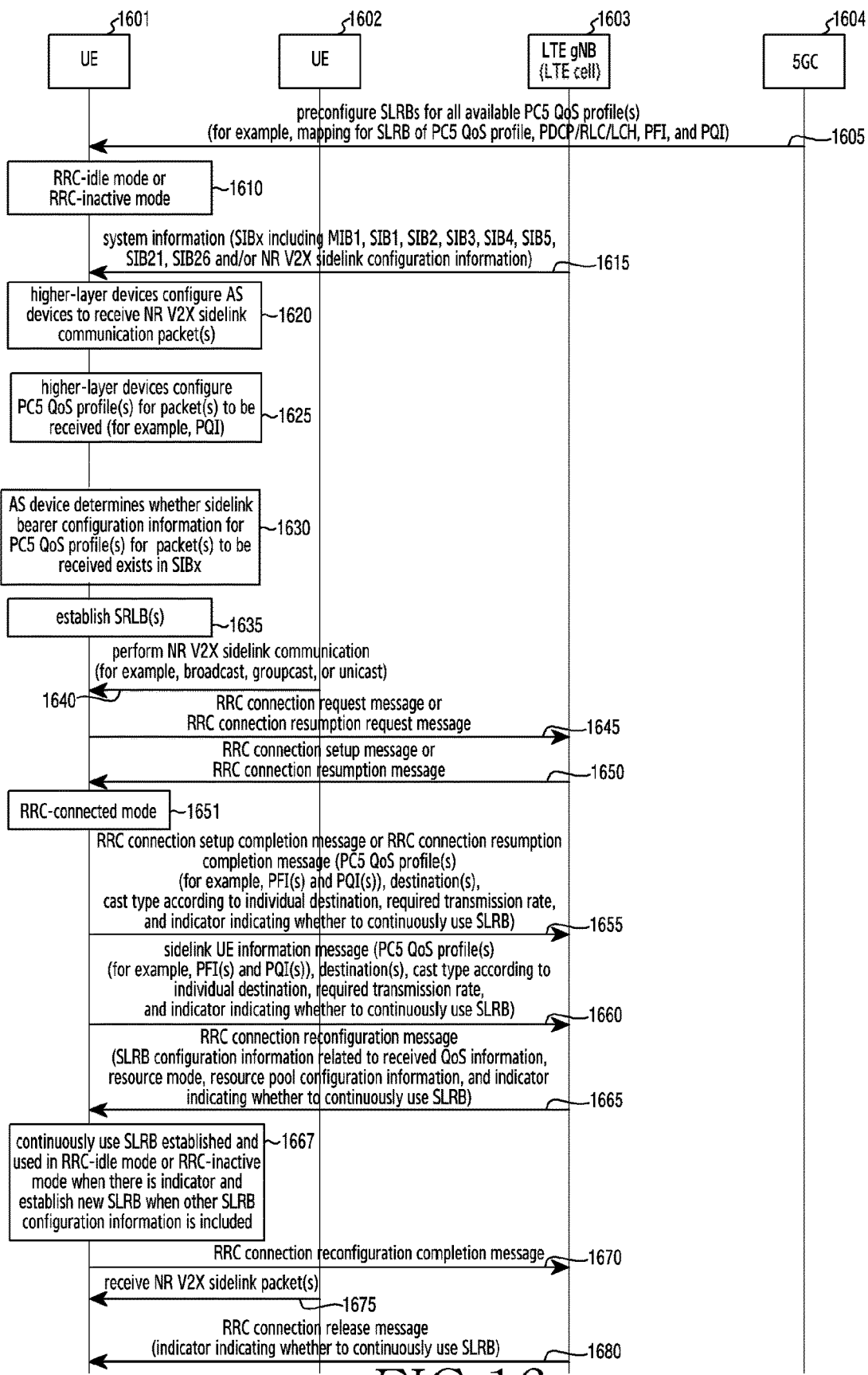
FIG. 16 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an LTE eNB during NR V2X sidelink communication, managing the established SLRB in a wireless communication system according to various embodiments of the disclosure.

FIG. 16 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an LTE eNB during NR V2X sidelink communication, managing the established SLRB in a wireless communication system according to various embodiments of the disclosure.

A UE 1601 according to an embodiment of the disclosure may refer to a vehicle UE or a pedestrian UE. The UE 1601 may support LTE V2X sidelink communication and/or NR V2X sidelink communication. The LTE eNB according to an embodiment of the disclosure may periodically broadcast or signal system information related to LTE V2X sidelink configuration information or system information related to NR V2X sidelink configuration information.

Referring to FIG. 16, the UE 1601 capable of performing NR V2X sidelink communication may preconfigure SLRB configuration information for PC5 QoS profile(s) from a core network in operation 1605. At this time, SLRB configuration information may be preconfigured for all available PC5 QoS profile(s). According to an embodiment, the preconfigured SLRB configuration information may include, for example, mapping for the SLRB of the PC5 QoS profile, PDCP/RLC/LCH, PFI, PQI, and the like.

The UE 1601 does not establish the RRC connection with the LTE eNB 1603 and thus may be in the RRC-idle mode (RRC_IDLE) or the RRC-inactive mode (RRC_INACTIVE) in operation 1610.

The UE 1601 in the RRC-idle mode or the RRC-inactive mode may discover a suitable LTE cell 1603 through a cell selection procedure or a cell reselection procedure and camp on the discovered cell to acquire system information in operation 1615. According to an embodiment, the system information may be one or a plurality of SIBx including MIB1, SIB1, SIB2, SIB3, SIB4, SIB5, SIB21, SIB26, and/or NR V2X sidelink configuration information defined/introduced for NR V2X sidelink communication. The cell which the UE camps on may be referred to a serving cell (SCell) or a primary cell (PCell).

Specifically, in operation 1615, in case that the existence of SIBx described through a scheduling information list (SchedulingInfoList) in SIB1 (SystemInformationBlock-Type1) received from the cell (Scell or PCell) is indicated, the UE 1601 in the RRC-idle mode or the RRC-inactive mode may acquire SIBx. Alternatively, in case that valid SIBx is not stored, the UE 1601 may acquire SIBx. In case that the LTE eNB 1603 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-Common-TxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/LCH configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1620, higher-layer devices may configure the AS devices to receive NR V2X sidelink communication packet(s). An indication indicating reception thereof in a specific frequency may be made.

In operation 1625, the higher-layer devices may configure PC5 QoS profile(s) of packet(s) to be received (PQI according to an embodiment) and transfer the configured PC5 QoS profile(s) to the AS devices. In case that there is no indication indicating reception of NR V2X sidelink communication packet(s) in a specific frequency in operation 1620, the indication may be made in operation 1625.

In operation 1630, the AS device may determine whether sidelink bearer configuration information for PC5 QoS profile(s) for the packets received in operation 1625 exists in SIBx received in operation 1615.

In case that the sidelink bearer configuration information for the PC5 QoS profile(s) for the packets to be received exists in SIBx received in operation 1615, the AS device may establish the SLRB(s) in operation 1635. In case that the information is not included in SIBx, the SLRB(s) may be established on the basis of the information preconfigured in operation 1605.

In operation 1640, the UE 1601 may perform NR V2X sidelink communication with another UE 1602 through the SLRB(s) established in operation 1635. The NR V2X sidelink communication may be performed through broadcast, groupcast, or unicast.

In operation 1645, the UE 1601 in the RRC-idle mode may transmit an RRC connection request message (RRC-ConnectionRequest message) to the LTE eNB in order to perform an RRC connection establishment procedure with the LTE eNB 1603. In operation 1650, the LTE eNB may transmit an RRC connection setup message (RRCConnectionSetup message) to the UE in the RRC-idle mode. The UE 1601 receiving the RRC connection setup message may apply configuration information included in the message and then transition to the RRC-connected mode in operation 1651. The UE 1601 may continuously perform NR V2X sidelink communication with another UE 1615 on the basis of the system information acquired in operation 1602 through the SLRB(s) established in operation 1635. The UE 1601 may transmit an RRC connection setup completion message (RRCConnectionSetupComplete message) to the LTE eNB in operation 1655. The RRC connection setup completion message may include QoS information related to the SLRB(s) established and used in the RRC-idle mode. According to an embodiment, the RRC connection setup completion message may include at least one piece of the following information related to the SLRB(s) established and used in the RRC-idle mode.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1645, the UE 1601 in the RRC-inactive mode may transmit an RRC connection resumption request message (RRCConnectionResumeRequest message) to the LTE eNB in order to perform an RRC connection resumption procedure (RRC connection resume procedure) with the LTE eNB 1603. In operation 1650, the LTE eNB may transmit an RRC connection resumption message (RRCConnectionResume message) to the UE in the RRC-inactive mode. The UE 1601 receiving the RRC connection resumption message may apply configuration information included in the message and then transition to the RRC-connected mode in operation 1651. The UE 1601 may continuously perform NR V2X sidelink communication with another UE 1615 on the basis of the system information acquired in operation 1602 through the SLRB(s) established in operation 1635. The UE 1601 may transmit an RRC connection resumption completion message (RRCConnectionResumeComplete message) to the LTE eNB in operation 1655. The RRC connection resumption completion message may include QoS information related to the SLRB(s) established and used in the RRC-inactive mode. According to an embodiment, at least one piece of the following information related to the SLRB(s) established and used in the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1660, the UE 1601 in the RRC-connected mode may transmit a sidelink UE information message (SidelinkUEInformation message) to the LTE eNB. In case that the QoS information is not included in the RRC connection setup completion message or the RRC connection resumption completion message in operation 1655, operation 1660 may be performed. The sidelink UE information message may include QoS information related to the SLRB(s) established and used in the RRC-idle mode or the RRC-inactive mode. According to an embodiment, at least one piece of the following information related to the SLRB(s) established and used in the RRC-idle mode or the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1665, the LTE eNB may insert at least one of piece of the following information into an RRC connection reconfiguration message and transmit the RRC connection reconfiguration message to the UE in the RRC-connected mode.

SLRB configuration information related to QoS information included in operation 1655 or operation 1660

An indicator (indication) indicating whether to continuously use SLRB configuration information established and used in the RRC-idle mode or the RRC-inactive mode Resource mode (mode 3 or mode 4)

Resource pool configuration information according to resource mode

In operation 1667, the UE 1601 may determine whether to continuously use the SLRB established and used in the RRC-idle mode or the RRC-inactive mode on the basis of the message received in operation 1665. According to an embodiment, in case that an indicator indicating the continuous use is inserted into the RRC connection reconfiguration (RRCConnectionReconfiguration) message or in case that information which is the same as the SLRB established and used in the RRC-idle mode or the RRC-inactive mode is included, the UE 1601 in the RRC-connected mode may perform NR V2X communication with another UE 1602 by continuously using the conventionally used SLRB. In case that SLRB configuration information which was not established in the RRC-idle mode or the RRC-inactive mode is included, the UE 1601 in the RRC-connected mode may newly establish SLRB(s) and perform NR V2X communication with another UE 1602. In case that the UE 1601 newly establishes SLRB(s) and performs unicast communication with another UE 1602, the UE 1601 may transmit a PC5 RRC message including new SLRB configuration information to another UE 1602.

The UE 1601 may transmit an RRC connection reconfiguration completion (RRCConnectionReconfigurationComplete) message to the LTE eNB in operation 1670 and perform NR V2X sidelink communication (transmit NR V2X sidelink packet(s)) with another UE 1602 in operation 1675.

In case that the UE transmitting and receiving data in the RRC-connected mode has no data transmission/reception for a predetermined reason or for a predetermined time, the LTE eNB may switch the UE to the RRC-idle mode (RRC_IDEL) or the RRC-inactive mode (RRC_INACTIVE) by transmitting an RRC connection release message (RRCConnectionRelease message) in operation 1680. The message may include an indicator or an information element indicating whether to continuously use or release the SLRB used in the RRC-connected mode. The UE 1601 in the RRC-idle mode or the RRC-inactive mode may perform NR V2X sidelink communication with another UE 1602 by determining whether to continuously use or release the SLRB used with another UE 1602 on the basis of information included in the RRC connection release message or whether to newly establish SLRB(s) on the basis of system information. In case that the UE 1601 is required to change or release the SLRB conventionally used with another UE 1602 or to newly establish SLRB(s), if the UE is performing unicast communication with another UE 1602, the UE 1601 may transmit a PC5 RRC message including new SLRB configuration information to another UE 1602.

In operation 1651, the UE 1601 may transition from the RRC-idle mode or the RRC-inactive mode to the RRC-connected mode and then release all SLRBs established and used in the RRC-idle mode or the RRC-inactive mode.

Figure 17:
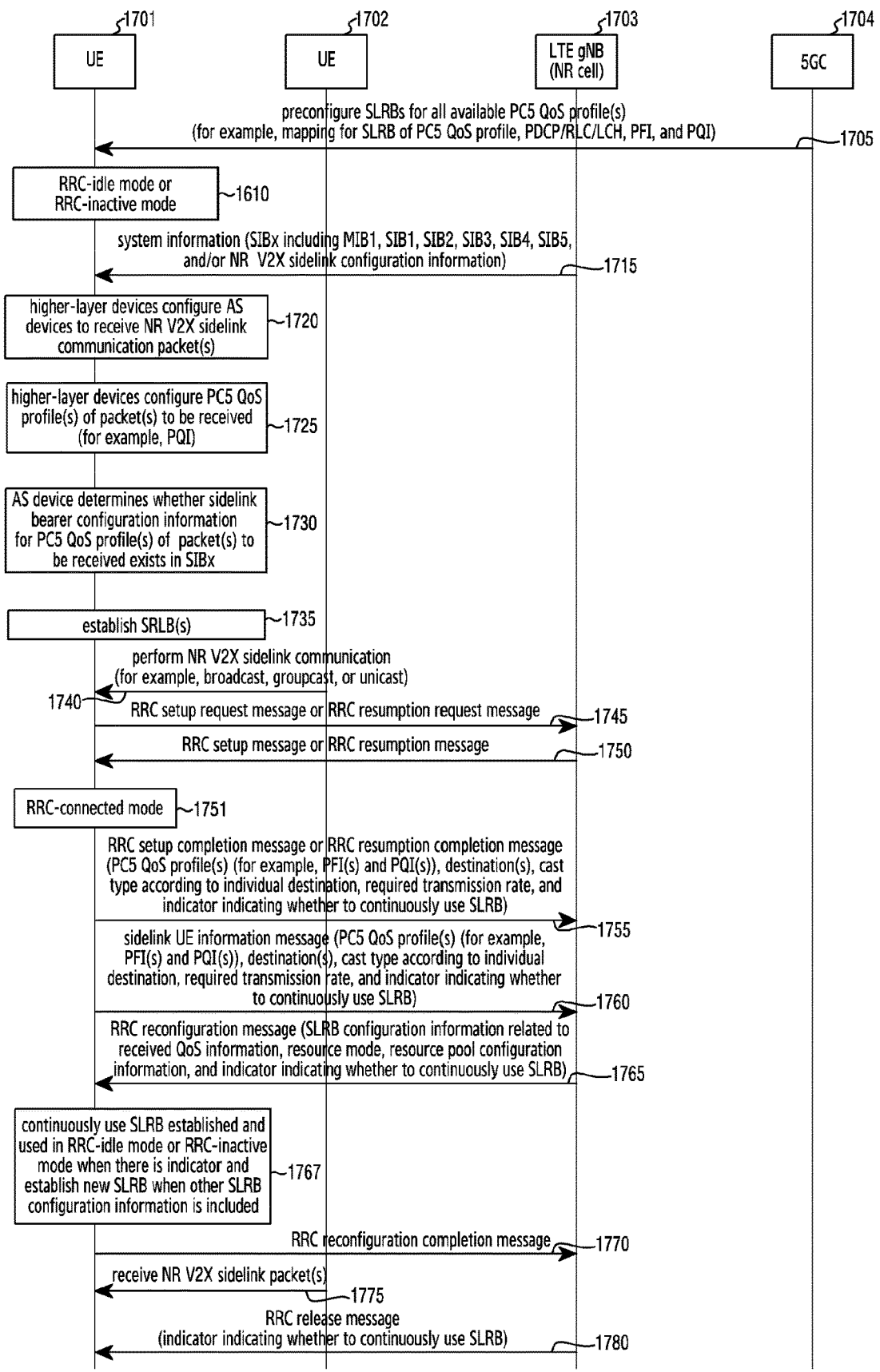
FIG. 17 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an NR eNB during NR V2X sidelink communication, managing the established SLRB in a wireless communication system according to various embodiments of the disclosure.

FIG. 17 illustrates an example of a procedure in which, in case that a UE supporting NR V2X sidelink communication establishes a sidelink bearer (sidelink radio bearer (SLRB)) in an RRC-idle mode (RRC_IDLE) or an RRC-inactive mode (RRC_INACTIVE) and switches to an RRC-connected mode (RRC_CONNECTED) with an NR eNB during NR V2X sidelink communication, managing the established SLRB in a wireless communication system according to various embodiments of the disclosure.

A UE 1701 according to an embodiment of the disclosure may refer to a vehicle UE or a pedestrian UE. The UE 1701 may support LTE V2X sidelink communication and/or NR V2X sidelink communication. The NR gNB according to an embodiment of the disclosure may periodically broadcast or signal system information related to LTE V2X sidelink configuration information or system information related to NR V2X sidelink configuration information.

Referring to FIG. 17, the UE 1701 capable of performing NR V2X sidelink communication may preconfigure SLRB configuration information for PC5 QoS profile(s) from a core network in operation 1705. At this time, SLRB configuration information may be preconfigured for all available PC5 QoS profile(s). According to an embodiment, the preconfigured SLRB configuration information may include, for example, mapping for the SLRB of the PC5 QoS profile, PDCP/RLC/LCH, PFI, PQI, and the like.

The UE 1701 does not establish the RRC connection with the NR gNB 1703 and thus may be in the RRC-idle mode (RRC_IDLE) or the RRC-inactive mode (RRC_INACTIVE) in operation 1710.

The UE 1701 in the RRC-idle mode or the RRC-inactive mode may discover a suitable NR cell 1703 through a cell selection procedure or a cell reselection procedure and camp on the discovered cell to acquire system information in operation 1715. According to an embodiment, the system information may be one or a plurality of SIBx including MIB1, SIB1, SIB2, SIB3, SIB4, SIB5, SIB6, or NR V2X sidelink configuration information defined/introduced for NR V2X sidelink communication. The cell which the UE camps on may be referred to a serving cell (SCell) or a primary cell (PCell).

Specifically, in operation 1715, in case that the existence of SIBx described through a scheduling information list (SchedulingInfoList) in SIB1 (SystemInformationBlockType1) received from the cell (Scell or PCell) is indicated, the UE 1701 in the RRC-idle mode or the RRC-inactive mode may acquire SIBx. Alternatively, in case that valid SIBx is not stored, the UE 1701 may acquire SIBx. In case that the NR gNB 1703 broadcasts SIBx, SIBx selectively includes s1-V2X-ConfigCommon. s1-V2X-ConfigCommon may include at least one of v2x-CommRxPool, v2x-CommTxPoolNormalCommon, v2x-CommTxPoolExceptional, v2x-SyncConfig, v2x-InterFreqInfoList, v2x-ResourceSelectionConfig, zoneConfig, typeTxSync, threshSS-TxPrioritization, anchorCarrierFreqList, offsetDFN, cbr-CommonTxConfigList, cbr-pssch-TxConfigList, v2x-packetDuplicationConfig, syncFreqList, slss-TxMultiFreq, v2x-FreqSelectionConfigList, and threshS-RSSI-CBR. In addition, SIBx may include sidelink bearer (sidelink radio bearer (SLRB)) configuration information for PC5 QoS profile(s). According to an embodiment, sidelink bearer configuration information for one or a plurality of PC5 QoS profiles may include mapping information for one SLRB and/or PDCP/RLC/LCH configuration information. Alternatively, sidelink bearer configuration information for one PC5 QoS profile may include mapping information for one or a plurality of SLRBs and/or PDCP/RLC/LCH configuration information. The PC5 QoS profile may be at least one of packet filtering information (PFI), a range and/or a required transmission rate (required data rate), or PC5 QoS parameters/characteristics for a PC5 5G QoS identifier (PQI) (see [Table 1]).

In operation 1720, higher-layer devices may configure the AS devices to receive NR V2X sidelink communication packet(s). An indication indicating reception thereof in a specific frequency may be made.

In operation 1725, the higher-layer devices may configure PC5 QoS profile(s) of packet(s) to be received (PQI according to an embodiment) and transfer the configured PC5 QoS profile(s) to the AS devices. In case that there is no indication indicating reception of NR V2X sidelink communication in a specific frequency in operation 1720, the indication may be made in operation 1725.

In operation 1730, the AS device may determine whether sidelink bearer configuration information for PC5 QoS profile(s) for the packets received in operation 1725 exists in SIBx received in operation 1715.

In case that the sidelink bearer configuration information for the PC5 QoS profile(s) for the packets to be received exists in SIBx received in operation 1715, the AS device may establish the SLRB(s) in operation 1735. In case that the information is not included in SIBx, the SLRB(s) may be established on the basis of the information preconfigured in operation 1705.

In operation 1740, the UE 1701 may perform NR V2X sidelink communication with another UE 1702 through the SLRB(s) established in operation 1735. The NR V2X sidelink communication may be performed through broadcast, groupcast, or unicast.

In operation 1745, the UE 1701 in the RRC-idle mode may transmit an RRC setup request message (RRCSetupRequest message) to the NR gNB in order to perform an RRC connection establishment procedure with the NR gNB 1703. In operation 1750, the NR gNB may transmit an RRC setup message (RRCSetup message) to the UE in the RRC-idle mode. The UE 1701 receiving the RRC connection setup message may apply configuration information included in the message and then transition to the RRC-connected mode in operation 1751. The UE 1701 may continuously perform NR V2X sidelink communication with another UE 1702 on the basis of the system information acquired in operation 1715 through the SLRB(s) established in operation 1735. The UE 1701 may transmit an RRC setup completion message (RRCSetupComplete message) to the NR gNB in operation 1755. The RRC setup completion message may include QoS information related to the SLRB(s) established and used in the RRC-idle mode. According to an embodiment, the RRC setup completion message may include at least one piece of the following information related to the SLRB(s) established and used in the RRC-idle mode.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1745, the UE 1701 in the RRC-inactive mode may transmit an RRC resumption request message (RRCResumeRequest message) to the NR gNB in order to perform an RRC connection resumption procedure (RRC connection resume procedure) with the NR gNB 1703. In operation 1750, the NR gNB may transmit an RRC resumption message (RRCResume message) to the UE in the RRC-inactive mode. The UE 1701 receiving the RRC connection resumption message may apply configuration information included in the message and then transition to the RRC-connected mode in operation 1751. The UE 1701 may continuously perform NR V2X sidelink communication with another UE 1702 on the basis of the system information acquired in operation 1715 through the SLRB(s) established in operation 1735. The UE 1701 may transmit an RRC resumption completion message (RRCResumeComplete message) to the NR gNB in operation 1755. The RRC resumption completion message may include QoS information related to the SLRB(s) established and used in the RRC-inactive mode. According to an embodiment, at least one piece of the following information related to the SLRB(s) established and used in the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1760, the UE 1701 in the RRC-connected mode may transmit a sidelink UE information message (SidelinkUEInformation message) to the NR gNB. In case that the QoS information is not included in the RRC setup completion message or the RRC resumption completion message in operation 1755, operation 1760 may be performed. The sidelink UE information message may include QoS information related to the SLRB(s) established and used in the RRC-idle mode or the RRC-inactive mode. According to an embodiment, at least one piece of the following information related to the SLRB(s) established and used in the RRC-idle mode or the RRC-inactive mode may be included.

PC5 QoS profile(s)

According to an embodiment, one or a plurality of PC5 QoS flow identifiers (PFIs) and/or one or a plurality of PC5 5QIs (PQIs)

One or a plurality of pieces of destination information

A cast type according to an individual destination (for example, whether SLRB(s) established and used in the RRC-idle mode are used in unicast, broadcast, or groupcast)

An indicator or an SLRB identifier indicating whether to continuously use the SLRB established and used in the RRC-idle mode SLRB mapping information for PC5 QoS flow (for example, PFI to SLRB mapping and QoS profile to SLRB mapping)

In operation 1765, the NR gNB may insert at least one of piece of the following information into an RRC reconfiguration (RRCReconfiguration) message and transmit the RRC reconfiguration message to the UE in the RRC-connected mode.

SLRB configuration information related to QoS information included in operation 1755 or operation 1760

An indicator (indication) indicating whether to continuously use SLRB configuration information established and used in the RRC-idle mode or the RRC-inactive mode Resource mode (mode 3 or mode 4)

Resource pool configuration information according to resource mode

In operation 1767, the UE 1701 may determine whether to continuously use the SLRB established and used in the RRC-idle mode or the RRC-inactive mode on the basis of the message received in operation 1765. According to an embodiment, in case that an indicator indicating the continuous use is inserted into the RRC reconfiguration (RRCReconfiguration) message or in case that information which is the same as the SLRB established and used in the RRC-idle mode or the RRC-inactive mode is included, the UE 1701 in the RRC-connected mode may perform NR V2X communication with another UE 1702 by continuously using the conventionally used SLRB. In case that SLRB configuration information which was not established in the RRC-idle mode or the RRC-inactive mode is included, the UE 1701 in the RRC-connected mode may newly establish SLRB(s) and perform NR V2X communication with another UE 1702. In case that the UE 1701 newly establishes SLRB(s) and performs unicast communication with another UE 1702, the UE 1701 may transmit a PC5 RRC message including new SLRB configuration information to another UE 1702.

The UE 1701 may transmit an RRC reconfiguration completion (RRCReconfigurationComplete) message to the NR gNB in operation 1770 and perform NR V2X sidelink communication (transmit NR V2X sidelink packet(s)) with another UE 1702 in operation 1775.

In case that the UE transmitting and receiving data in the RRC-connected mode has no data transmission/reception for a predetermined reason or for a predetermined time, the NR gNB may switch the UE to the RRC-idle mode (RRC_IDEL) or the RRC-inactive mode (RRC_INACTIVE) by transmitting an RRC release message (RRCRelease message) in operation 1780. The message may include an indicator or an information element indicating whether to continuously use or release the SLRB used in the RRC-connected mode. The UE 1701 in the RRC-idle mode or the RRC-inactive mode may perform NR V2X sidelink communication with another UE 1702 by determining whether to continuously use or release the SLRB used with another UE 1702 on the basis of information included in the RRC connection release message or whether to newly establish SLRB(s) on the basis of system information. In case that the UE 1701 is required to change or release the SLRB conventionally used with another UE 1702 or to newly establish SLRB(s), if the UE is performing unicast communication with another UE 1702, the UE 1701 may transmit a PC5 RRC message including new SLRB configuration information to another UE 1702.

In operation 1751, the UE 1701 may transition from the RRC-idle mode or the RRC-inactive mode to the RRC-connected mode and then release all SLRBs established and used in the RRC-idle mode or the RRC-inactive mode.

Figure 18:
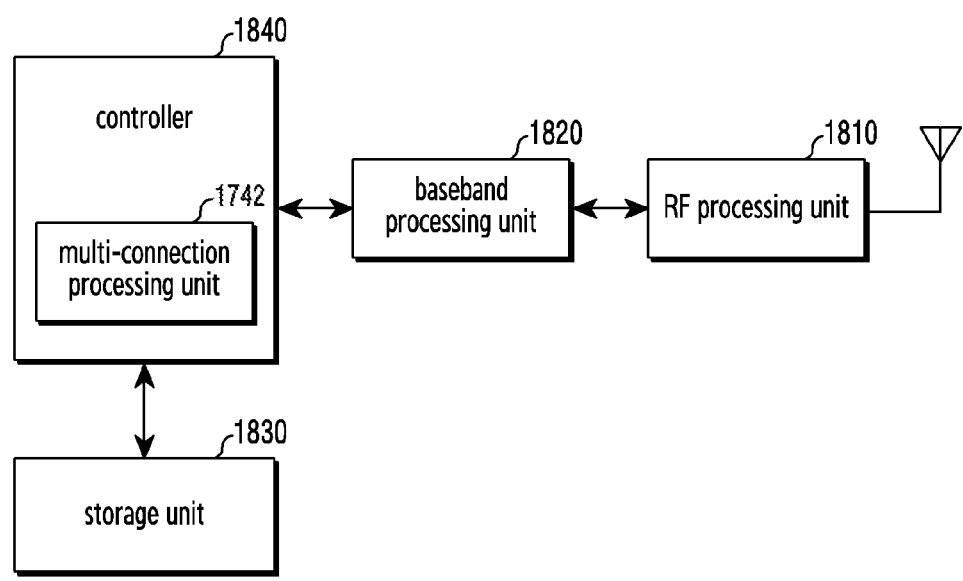
FIG. 18 illustrates an example of the structure of the UE in a wireless communication system according to various embodiments of the disclosure.

FIG. 18 illustrates an example of the structure of the UE in a wireless communication system according to various embodiments of the disclosure.

Referring to FIG. 18, the UE according to various embodiments of the disclosure may include a radio frequency (RF) processing unit 1810, a baseband processing unit 1820, a storage unit 1830, and a controller 1840.

The RF processing unit 1810 according to an embodiment of the disclosure may perform a function of transmitting and receiving a signal through a radio channel such as band conversion or amplification of a signal. That is, the RF processing unit 1810 may up-convert a baseband signal provided from the baseband processing unit 1820 into an RF band signal, transmit the same through an antenna, and down-convert the RF band signal received through the antenna into a baseband signal. For example, the RF processing unit 1810 may include a transmission filter, a reception filter, an amplifier, a mixer, an oscillator, a digital-to-analog convertor (DAC), an analog-to-digital convertor (ADC), and the like.

Although FIG. 18 illustrates only one antenna, the UE may include a plurality of antennas.

The RF processing unit 1810 may include a plurality of RF chains. Moreover, the RF processing unit 1810 may perform beamforming. For the beamforming, the RF processing unit 1810 may control a phase and a size of each signal transmitted/received through a plurality of antennas or antenna elements. Further, the RF processing unit 1810 may perform multiple-input multiple-output (MIMO) and receive a plurality of layers during MIMO operation. The RF processing unit 1810 may appropriately configure a plurality of antennas or antenna elements according to the control of the controller 1840 to perform reception beam sweeping or control a reception beam direction and a beam width such that the reception beam cooperates with a transmission beam.

The baseband processing unit 1820 may perform a function of conversion between a baseband signal and a bitstream according to a physical layer standard of the system. For example, in data transmission, the baseband processing unit 1820 may encode and modulate a transmission bitstream to generate complex symbols. In data reception, the baseband processing unit 1820 may reconstruct a reception bitstream by decoding and demodulating the baseband signal provided from the RF processing unit 1810. For example, in an orthogonal frequency division multiplexing (OFDM) scheme, in case that data is transmitted, the baseband processing unit 1820 may encode and modulate a transmission bitstream to generate complex symbols, map the complex symbols to subcarriers, and then configure OFDM symbols through an inverse fast Fourier transform (IFFT) operation or a cyclic prefix (CP) insertion. Further, in data reception, the baseband processing unit 1820 may divide the baseband signal provided from the RF processing unit 1810 in units of OFDM symbols, reconstruct the signals mapped to the subcarriers through a fast Fourier transform (FFT) operation, and then reconstruct a reception bitstream through demodulation and decoding.

The baseband processing unit 1820 and the RF processing unit 1810 may transmit and receive the signal as described above. Accordingly, the baseband processing unit 1820 and the RF processing unit 1810 may be referred to as a transmitter, a receiver, a transceiver, or a communication unit. Further, at least one of the baseband processing unit 1820 and the RF processing unit 1810 may include a plurality of communication modules to support a plurality of different radio access technologies. In addition, at least one of the baseband processing unit 1820 and the RF processing unit 1810 may include different communication modules to process signals in different frequency bands. For example, different radio access technologies may include an LTE network, an NR network, and the like. Further, the different frequency bands may include a super high frequency (SHF) (for example, 2.2 gHz and 2 ghz) band and a millimeter (mm) wave (for example, 60 GHz) band.

The storage unit 1830 may store data such as a basic program, an application, and configuration information for the operation of the UE. The storage unit 1830 may provide stored data according to a request from the controller 1830.

The controller 1840 may control the overall operation of the UE. For example, the controller 1840 may transmit and receive a signal through the baseband processing unit 1820 and the RF processing unit 1810. Further, the controller 1840 may record data in the storage unit 1840 and read the same. To this end, the controller 1840 may include at least one processor. For example, the controller 1840 may include a communication processor (CP) that performs a control for communication, and an application processor (AP) that controls a higher layer such as an application program.

Figure 19:
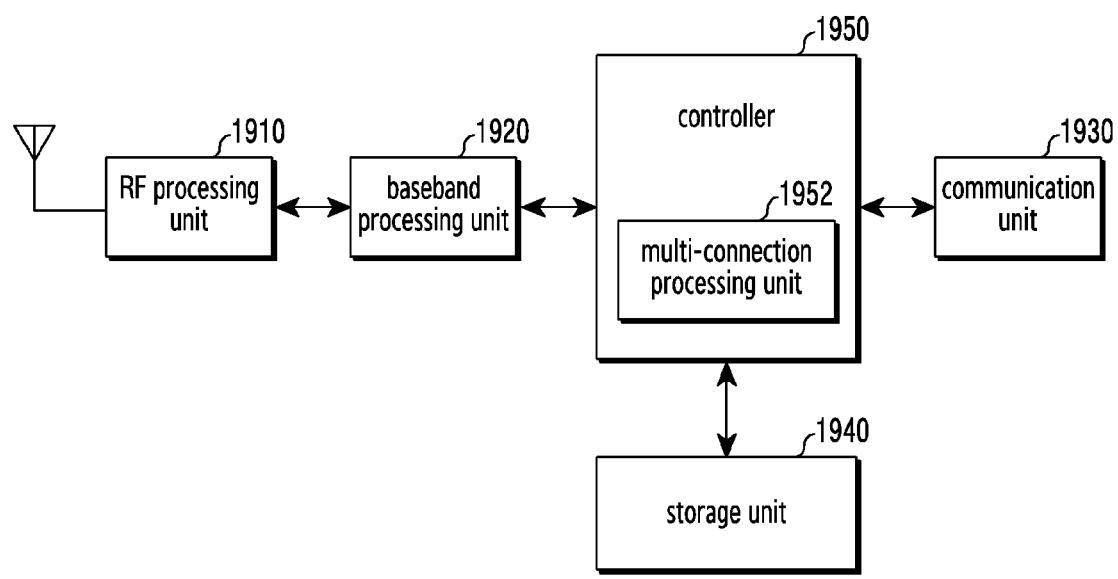
FIG. 19 illustrates an example of the structure of the BS in a wireless communication system according to various embodiments of the disclosure.

FIG. 19 illustrates an example of the structure of the BS in a wireless communication system according to various embodiments of the disclosure.

The BS according to an embodiment of the disclosure may include one or more transmission reception points (TRPs).

Referring to FIG. 19, the BS according to an embodiment of the disclosure may include an RF processing unit 1910, a baseband processing unit 1920, a backhaul communication unit 1930, a storage unit 1940, and a controller 1950.

The RF processing unit 1910 may perform a function of transmitting and receiving a signal through a radio channel such as band conversion and amplification of a signal. That is, the RF processing unit 1910 may up-convert a baseband signal provided from the baseband processing unit 1920 into an RF band signal, transmit the same through an antenna, and then down-convert the RF band signal received through the antenna into a baseband signal. For example, the RF processing unit 1910 may include a transmission filter, a reception filter, an amplifier, a mixer, an oscillator, a DAC, and an ADC. The RF processing unit 1910 may include at least one transceiver or at least one transceiver.

Although FIG. 19 illustrates only one antenna, the BS may include a plurality of antennas.

The RF processing unit 1910 may include a plurality of RF chains. In addition, the RF processing unit 1910 may perform beamforming. For the beamforming, the RF processing unit 1910 may control a phase and size of each of the signals transmitted and received through a plurality of antennas or antenna elements. The RF processing unit 1910 may perform a downlink MIMO operation by transmitting one or more layers.

The baseband processing unit 1920 may perform a function for conversion between a baseband signal and a bitstream according to physical layer standards of a first radio access technology. For example, in data transmission, the baseband processing unit 1920 may encode and modulate a transmission bitstream to generate complex symbols. In data reception, the baseband processing unit 1920 may reconstruct a reception bitstream by decoding and demodulating the baseband signal provided from the RF processing unit 1910. For example, in an OFDM scheme, in case that data is transmitted, the base band processing unit 1920 may encode and modulate the transmission bitstream to generate complex symbols, map the complex symbols to subcarriers, and then configure OFDM symbols through an IFFT operation and CP insertion. In addition, in case that data is received, the baseband processing unit 1920 may divide the baseband signal provided from the RF processing unit 1710 in units of OFDM symbols, reconstruct signals mapped with subcarriers through an FFT operation, and then reconstruct a reception bitstream through demodulation and decoding. The baseband processing unit 1920 and the RF processing unit 1910 may transmit and receive the signal as described above.

Accordingly, the baseband processing unit 1920 and the RF processing unit 1910 may be referred to as a transmitter, a receiver, a transceiver, a communication unit, or a wireless communication unit.

The communication unit 1930 may provide an interface for communicating with other nodes within the network. That is, the communication unit 1930 may convert a bitstream transmitted from a main BS to another node, for example, an auxiliary BS, a core network, or the like into a physical signal and may convert a physical signal received from another node into a bitstream.

The storage unit 1940 may store data such as a basic program, an application program, configuration information, and the like for the operation of the main BS. Particularly, the storage unit 1940 may store information on a bearer allocated to the accessed UE and a measurement result reported from the accessed UE. Further, the storage unit 1940 may store information which is a reference for determining whether to provide multiple connections to the UE or stop the connections. In addition, the storage unit 1940 may provide stored data according to a request from the controller 1950.

The controller 1950 may control the overall operation of the main BS. For example, the controller 1950 may transmit and receive a signal through the baseband processing unit 1920 and the RF processing unit 1910 or through the communication unit 1930. Further, the controller 1950 may record data in the storage unit 1940 and read the same. To this end, the controller 1950 may include at least one processor.

The methods according to various embodiments described in the claims or the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

INDUSTRIAL APPLICABILITY

An apparatus and a method according to various embodiments of the disclosure can effectively support vehicle-to-everything (V2X) in a wireless communication system.

The invention claimed is:

1. A method performed by a first user equipment (UE) in a wireless communication system, the method comprising:
    when the first UE is camping on a first cell, receiving, from the first cell, first system information including a first sidelink communication configuration in a radio resource control (RRC)-idle mode or an RRC-inactive mode;
    in case that the first UE is configured by upper layers to perform a sidelink communication for a frequency, identifying whether the frequency used for the sidelink communication is included in the first system information;
    in case that the frequency used for the sidelink communication is not included in the first system information, receiving, from a second cell, second system information including a second sidelink communication configuration; and
    performing the sidelink communication based on the second system information.

2. The method of claim 1, further comprising:
    in case that the second system information includes sidelink radio bearer (SLRB) configuration information, establishing an SLRB by applying the SLRB configuration information.

3. The method of claim 1,
    wherein the first UE is configured to perform both a first sidelink communication and a second sidelink communication.

4. The method of claim 1,
    in case that the second sidelink communication configuration is not included in the second system information, the sidelink communication is performed based on a preconfigured sidelink communication configuration.

5. A first user equipment (UE) in a wireless communication system, the first UE comprising:
    a transceiver; and
    a controller coupled to the transceiver,
    and configured to:
    when the first UE is camping on a first cell, receive, from the first cell, first system information including a first sidelink communication configuration in a radio resource control (RRC)-idle mode or an RRC-inactive mode,
    in case that the first UE is configured by upper layers to perform a sidelink communication for a frequency, identify whether the frequency used for the sidelink communication is included in the first system information, in case that the frequency used for the sidelink communication is not included in the first system information, receive, from a second cell, second system information including a second sidelink communication configuration, and perform the sidelink communication based on the second system information.

6. The first UE of claim 5, wherein the controller is further configured to:

in case that the second system information includes sidelink radio bearer (SLRB) configuration information, establish an SLRB by applying the SLRB configuration information.

7. The first UE of claim 5, wherein the first UE is configured to perform both a first sidelink communication and a second sidelink communication.

8. The first UE of claim 5, wherein, in case that the second sidelink communication configuration is not included in the second system information, the sidelink communication is performed based on a preconfigured sidelink communication configuration.

* * * * *